(12) United States Patent
Kimura

(10) Patent No.: US 8,384,932 B2
(45) Date of Patent: Feb. 26, 2013

(54) IMAGE FORMING APPARATUS AND METHOD THEREOF

(75) Inventor: Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 815 days.

(21) Appl. No.: 12/329,339

(22) Filed: Dec. 5, 2008

(65) Prior Publication Data

US 2009/0148004 A1 Jun. 11, 2009

(30) Foreign Application Priority Data

Dec. 6, 2007 (JP) ................... 2007-315679

(51) Int. Cl.
*G06F 3/12* (2006.01)
*G06K 9/00* (2006.01)
(52) U.S. Cl. ...................... 358/1.15; 382/112
(58) Field of Classification Search .......... 382/112, 382/141; 358/1.15
See application file for complete search history.

(56) References Cited

U.S. PATENT DOCUMENTS

| 7,965,402 B2 * | 6/2011 | Saito ................. 358/1.15 |
| 2004/0179717 A1 * | 9/2004 | Furukawa et al. ........ 382/112 |

FOREIGN PATENT DOCUMENTS

| JP | 2001-96872 | 4/2001 |
| JP | 2005-205852 | 8/2005 |

* cited by examiner

*Primary Examiner* — Charlotte M Baker
*Assistant Examiner* — Justin Katzwhite
(74) *Attorney, Agent, or Firm* — Canon U.S.A., Inc. IP Division

(57) ABSTRACT

Prior to image output of output information, printing information is analyzed and an important inspection processing item regarding inspection to be performed on the image output, and an inspection point, are selected. Inspection instruction information including the important inspection processing item and the inspection point that have been selected is generated for inspection of the output results which are image-output. The generated inspection instruction information is then output.

9 Claims, 36 Drawing Sheets

| PRIORITY | PROCESSED COMMAND | IMPORTANT INSPECTION PROCESSING ITEM | INSPECTION POINT | INSTRUCTION CONTENT | DETAILS OF INSTRUCTION CONTENT |
|---|---|---|---|---|---|
| 1 | FONT SPECIFICATION | CHARACTER OMISSION VERIFICATION | EXISTENCE OF A CHARACTER OMISSION | A CHARACTER OMISSION IN THE SPECIFIED REGION | CONFIRM WHETHER OR NOT THERE IS A BLANK WITHIN A CHARACTER REGION SPECIFIED AT FONT PROCESSING |
| 2 | DRAWING PROCESSING OF FONTS WITH A PARTICULAR SIZE OR LESS | SMALL CHARACTER VERIFICATION | EXISTENCE OF A SMUDGED AND ILLEGIBLE CHARACTER | READ AN INSPECTION IMAGE WITH HIGH RESOLUTION, AND COMPARE THIS WITH AN IMAGE TO BE EVALUATED | CONFIRM WHETHER OR NOT THERE IS A SMUDGED AND ILLEGIBLE CHARACTER WITHIN THE SPECIFIED REGION |
| 3 | DRAWING PROCESSING OF LINES WITH A PARTICULAR WIDTH OR LESS | THIN LINE VERIFICATION | CONFIRMATION OF A FADED LINE | READ AN INSPECTION IMAGE WITH HIGH RESOLUTION, AND COMPARE THIS WITH AN IMAGE TO BE EVALUATED | CONFIRM WHETHER OR NOT THERE IS A THIN FADED LINE WITHIN THE SPECIFIED REGION |
| 4 | BK SINGLE-COLORED OBJECT | BK SINGLE COLOR PRINTING | CONFIRMATION OF COLOR PROCESSING | READ AN INSPECTION IMAGE WITH HIGH GRADATION, SUBJECT THIS TO COLOR SEPARATION, AND CONFIRM THIS | CONFIRM WHETHER OR NOT AN IMAGE WITHIN THE SPECIFIED REGION IS PRINTED WITH A SINGLE COLOR OF BK |
| ... | ... | ... | ... | ... | ... |

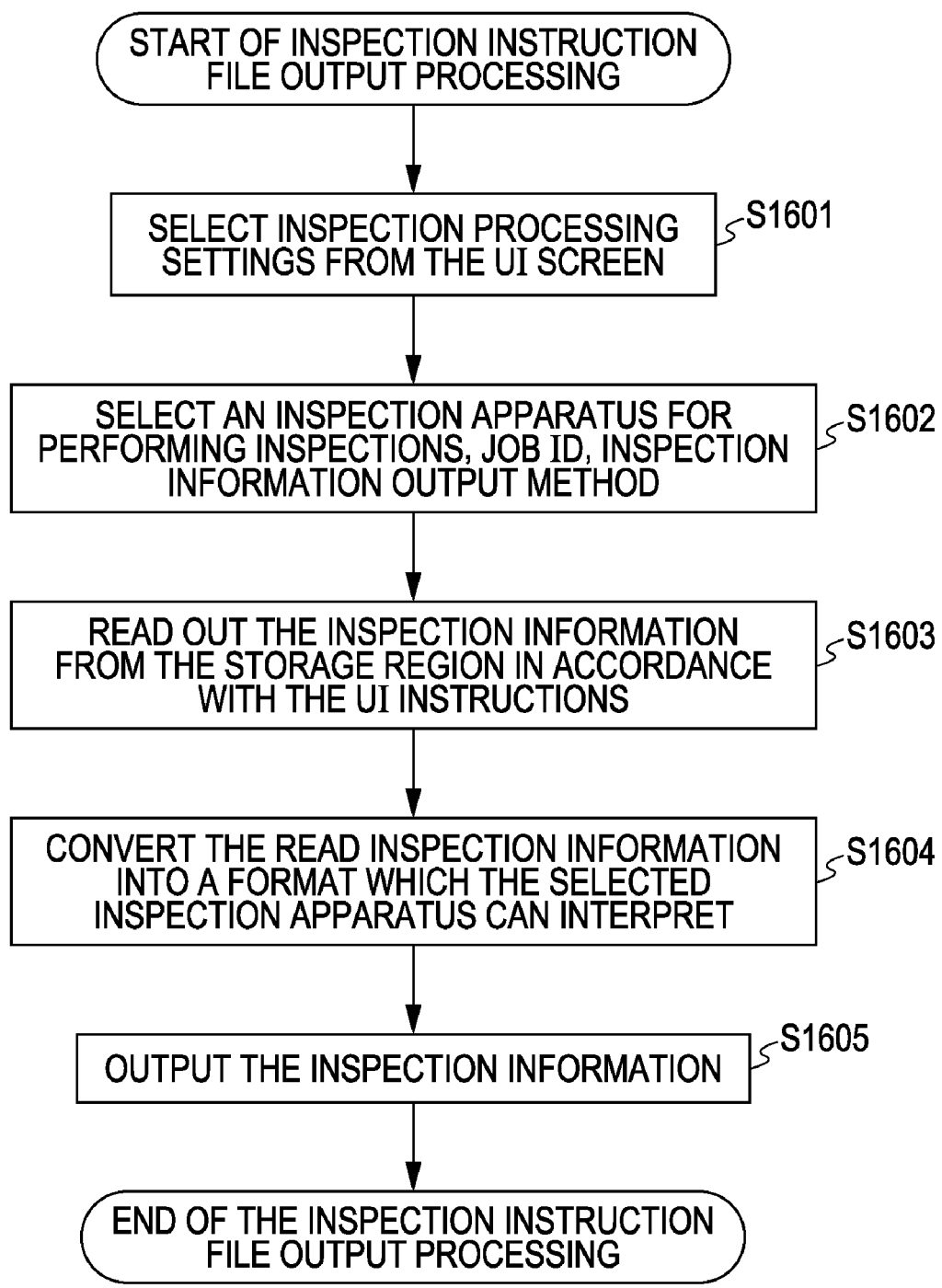

INSPECTION INSTRUCTION

(1) SECOND PAGE

INCLUDING A SMALL CHARACTER REGION
COORDINATES : xxx, yyy
PERFORM HIGH-RESOLUTION INSPECTION (2) FOURTH PAGE INCLUDING A THIN-LINE PRINTING REGION
COORDINATES : xxx, yyy
PERFORM HIGH-RESOLUTION INSPECTION
⋮

| PRIORITY | PROCESSED COMMAND | IMPORTANT INSPECTION PROCESSING ITEM | INSPECTION POINT | INSTRUCTION CONTENT | DETAILS OF INSTRUCTION CONTENT | NUMBER OF INSPECTION SELECTIONS | NUMBER OF INSPECTION EFFECT CONFIRMATIONS | INCLUDING INSPECTION EFFECTS | INSPECTION EFFECT RATIO |
|---|---|---|---|---|---|---|---|---|---|
| 1 | FONT SPECIFICATION | CHARACTER OMISSION VERIFICATION | EXISTENCE OF A CHARACTER OMISSION | A CHARACTER OMISSION IN THE SPECIFIED REGION | CONFIRM WHETHER OR NOT THERE IS A BLANK WITHIN A CHARACTER REGION SPECIFIED AT FONT PROCESSING | 202 | 100 | 42 | 42.0% |
| 2 | DRAWING PROCESSING OF FONTS WITH A PARTICULAR SIZE OR LESS | SMALL CHARACTER VERIFICATION | EXISTENCE OF A SMUDGED AND ILLEGIBLE CHARACTER | READ AN INSPECTION IMAGE WITH HIGH RESOLUTION, AND COMPARE THIS WITH AN IMAGE TO BE EVALUATED | CONFIRM WHETHER OR NOT THERE IS A SMUDGED AND ILLEGIBLE CHARACTER WITHIN THE SPECIFIED REGION | 46 | 36 | 32 | 88.8% |
| 3 | DRAWING PROCESSING OF LINES WITH A PARTICULAR WIDTH OR LESS | THIN LINE VERIFICATION | CONFIRMATION OF A FADED LINE | READ AN INSPECTION IMAGE WITH HIGH RESOLUTION, AND COMPARE THIS WITH AN IMAGE TO BE EVALUATED | CONFIRM WHETHER OR NOT THERE IS A THIN FADED LINE WITHIN THE SPECIFIED REGION | 21 | 7 | 7 | 100.0% |
| 4 | BK SINGLE-COLORED OBJECT | BK SINGLE COLOR PRINTING | CONFIRMATION OF COLOR PROCESSING | READ AN INSPECTION IMAGE WITH HIGH GRADATION, SUBJECT THIS TO COLOR SEPARATION, AND CONFIRM THIS | CONFIRM WHETHER OR NOT AN IMAGE WITHIN THE SPECIFIED REGION IS PRINTED WITH A SINGLE COLOR OF BK | 4 | 3 | 2 | 66.7% |
| ... | ... | ... | ... | ... | ... | | | | |

| PRIORITY | PROCESSED COMMAND | IMPORTANT INSPECTION PROCESSING ITEM | INSPECTION POINT | INSTRUCTION CONTENT | DETAILS OF INSTRUCTION CONTENT |
|---|---|---|---|---|---|
| 1 | FONT SPECIFICATION | CHARACTER OMISSION VERIFICATION | EXISTENCE OF A CHARACTER OMISSION | A CHARACTER OMISSION IN THE SPECIFIED REGION | CONFIRM WHETHER OR NOT THERE IS A BLANK WITHIN A CHARACTER REGION SPECIFIED AT FONT PROCESSING |
| 2 | DRAWING PROCESSING OF FONTS WITH A PARTICULAR SIZE OR LESS | SMALL CHARACTER VERIFICATION | EXISTENCE OF A SMUDGED AND ILLEGIBLE CHARACTER | READ AN INSPECTION IMAGE WITH HIGH RESOLUTION, AND COMPARE THIS WITH AN IMAGE TO BE EVALUATED | CONFIRM WHETHER OR NOT THERE IS A SMUDGED AND ILLEGIBLE CHARACTER WITHIN THE SPECIFIED REGION |
| 3 | DRAWING PROCESSING OF LINES WITH A PARTICULAR WIDTH OR LESS | THIN LINE VERIFICATION | CONFIRMATION OF A FADED LINE | READ AN INSPECTION IMAGE WITH HIGH RESOLUTION, AND COMPARE THIS WITH AN IMAGE TO BE EVALUATED | CONFIRM WHETHER OR NOT THERE IS A THIN FADED LINE WITHIN THE SPECIFIED REGION |
| 4 | BK SINGLE-COLORED OBJECT | BK SINGLE COLOR PRINTING | CONFIRMATION OF COLOR PROCESSING | READ AN INSPECTION IMAGE WITH HIGH GRADATION, SUBJECT THIS TO COLOR SEPARATION, AND CONFIRM THIS | CONFIRM WHETHER OR NOT AN IMAGE WITHIN THE SPECIFIED REGION IS PRINTED WITH A SINGLE COLOR OF BK |
| ... | ... | ... | ... | ... | ... |
| n-1 | PaperSelect | DETECTION OF PAPER TYPE | CONFIRMATION OF PAPER | CONFIRM WHETHER OR NOT THE EMPLOYED PAPER IS SET ACCORDING TO THE SETTINGS | CONFIRM WHETHER OR NOT THE EMPLOYED PAPER IS SET ACCORDING TO THE SETTINGS |
| N | Trapping | TRAPPING PROCESSING | EXISTENCE OF TRAPPING PROCESSING | CONFIRM WHETHER OR NOT THE EFFECTS OF THE TRAPPING PROCESSING HAVE BEEN OBTAINED? | CONFIRM WHETHER OR NOT THERE IS A WHITEOUT |

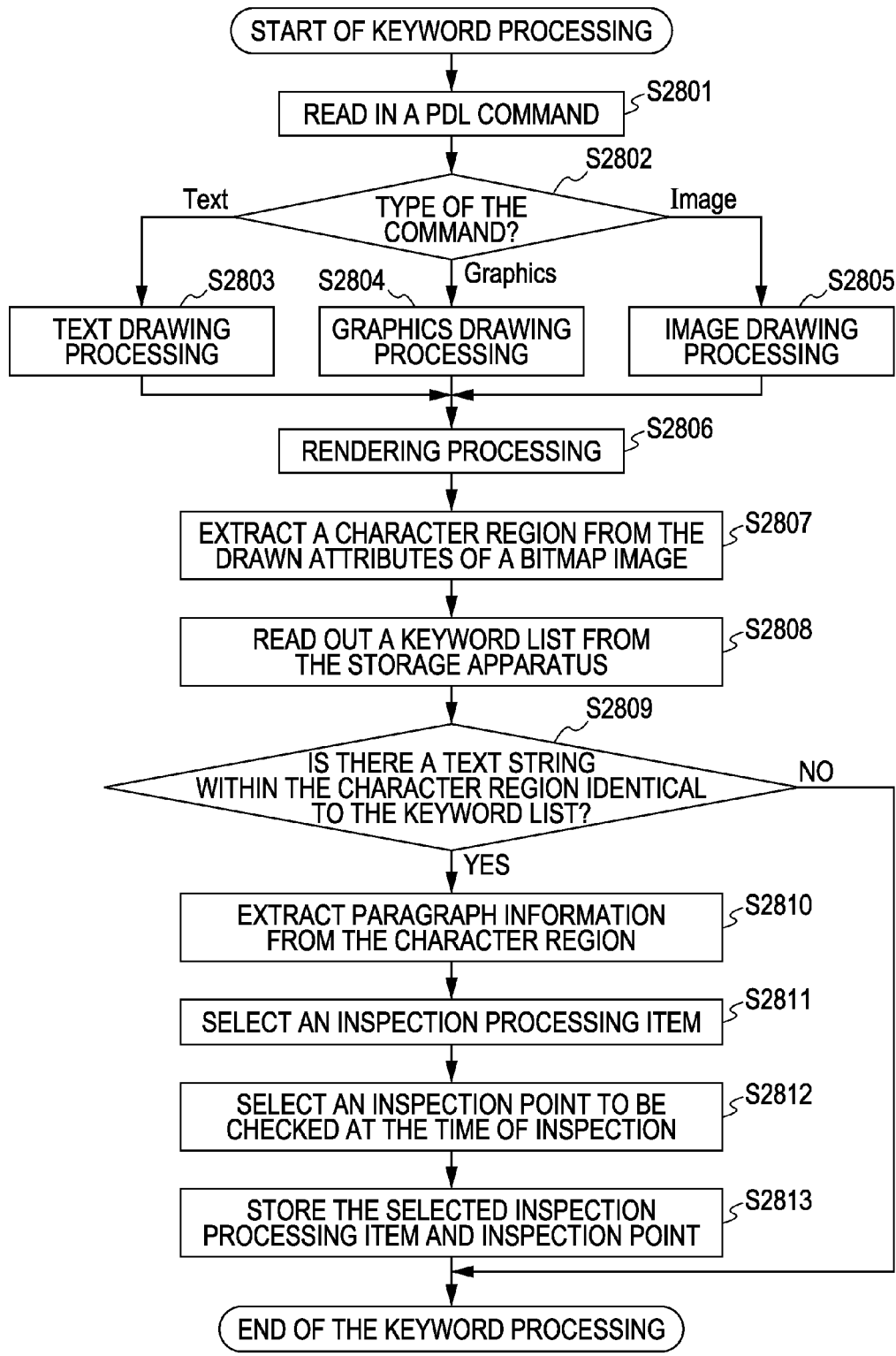

FIG. 21

REPORT 100
50
0
JANUARY FEBRUARY MARCH APRIL

☒ NEW YORK
■ BOSTON
☐ SEATTLE

EXPLANATION OF DISCLAIMERS
PLEASE USE THE FOLLOWING MATTERS WITH A CUSTOMER'S RESPONSIBILITY
(1) AAAA
(2) BBBB
(3) CCCC
 ⋮
(n) NNNN

−6−

A REGION DUPLICATED WITH A PRINTING REGION OF A KEYWORD "DISCLAIMERS" OR REGION SPECIFIED AS AN IMPORTANT REGION

FIG. 27
3601
| AN EXAMPLE OF COPY-FORGERY-INHIBITED PATTERN INFORMATION |
|---|
| PRINTING DATE AND TIME |
| DOCUMENT NAME |
| PRINTING USER NAME |
| NUMBER OF PRINT COPIES |
3602
REPORT
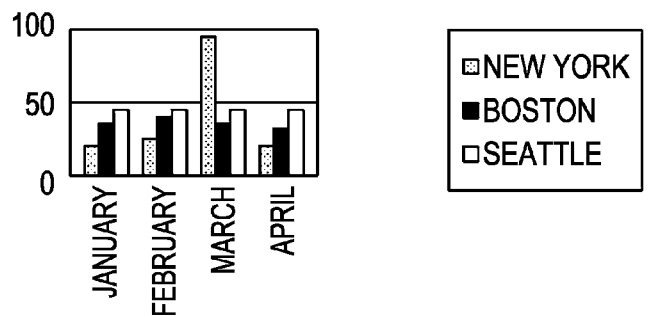
EXPLANATION OF DISCLAIMERS
PLEASE USE THE FOLLOWING MATTERS WITH A CUSTOMER'S RESPONSIBILITY

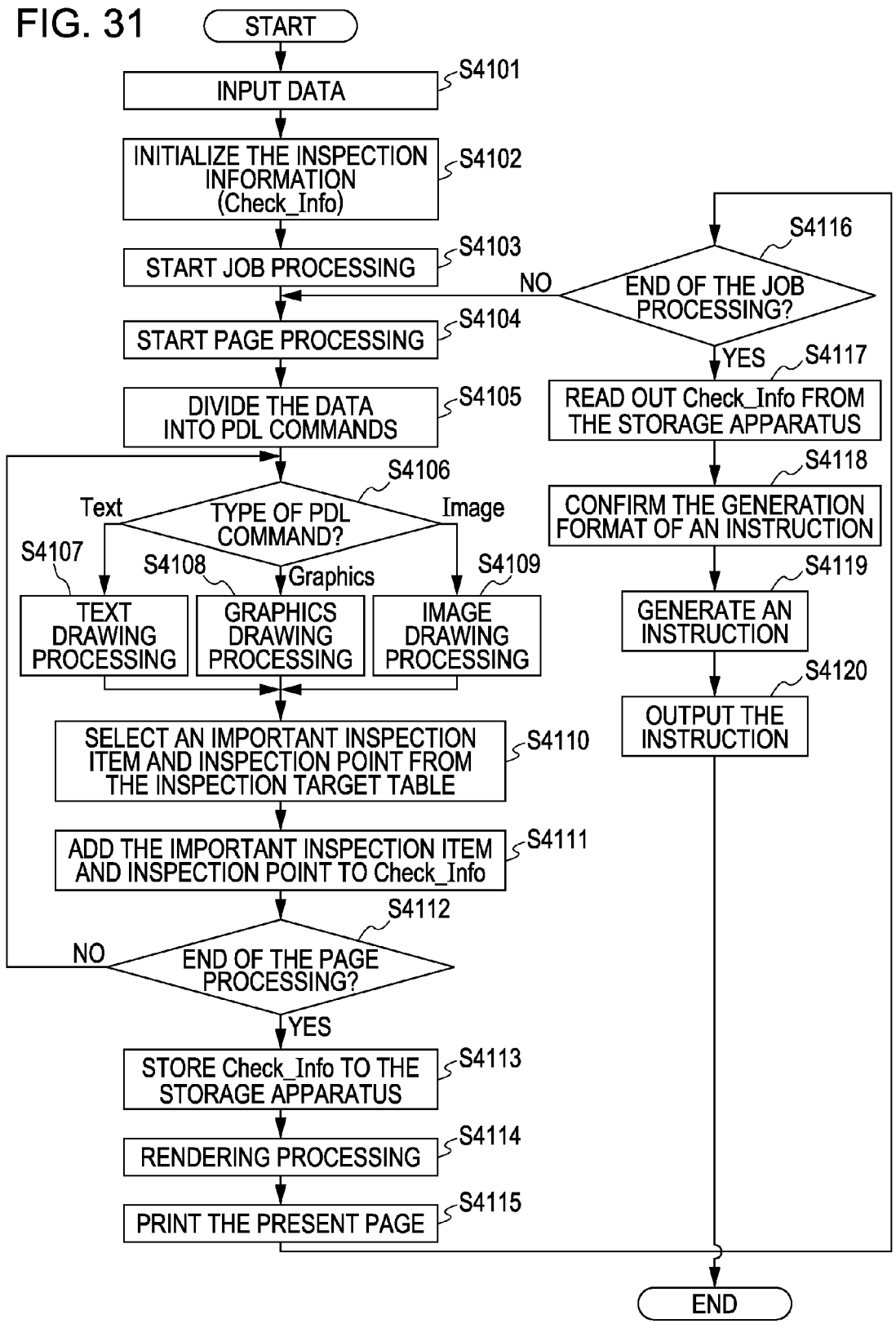

FIG. 32

| PRIORITY | INPUT DATA | IMPORTANT INSPECTION PROCESSING ITEM | INSPECTION POINT | INSTRUCTIONS TO OPERATOR | DESCRIPTION IN JDF |
|---|---|---|---|---|---|
| 1 | NO TARGET FONT (FONT REPLACEMENT) | EXISTENCE OF REPLACEMENT FONT | EXISTENCE OF A CHARACTER OMISSION | CONFIRM WHETHER OR NOT THERE IS A CHARACTER OMISSION WITHIN A REGION SPECIFIED AS FONT REPLACEMENT PROCESSING RESULTS | A CHARACTER OMISSION IN THE SPECIFIED REGION |
| 2 | FONTS WITH A n POINT OR LESS | SMALL CHARACTER VERIFICATION | EXISTENCE OF A SMUDGED AND ILLEGIBLE CHARACTER | CONFIRM WHETHER OR NOT THERE IS A SMUDGED AND ILLEGIBLE CHARACTER WITHIN THE SPECIFIED REGION | READ AN INSPECTION IMAGE WITH HIGH RESOLUTION |
| 3 | THIN LINES WITH m PIXEL OR LESS | THIN LINE VERIFICATION | CONFIRMATION OF LINE WIDTH | CONFIRM WHETHER OR NOT A THIN LINE WITHIN THE SPECIFIED REGION IS PRINTED ACCORDING TO THE SPECIFICATION | READ AN INSPECTION IMAGE WITH HIGH RESOLUTION |
| 4 | BK SINGLE-COLORED OBJECT | BK SINGLE COLOR PRINTING | WHETHER OR NOT DRAWING IS PERFORMED WITH A SINGLE COLOR OF BK | CONFIRM WHETHER OR NOT AN IMAGE WITHIN THE SPECIFIED REGION IS PRINTED WITH A SINGLE COLOR OF BK | READ AN INSPECTION IMAGE WITH HIGH GRADATION |
| | ... | ... | ... | ... | ... |
| n | USE OF SPECIAL PAPER (GLOSS) | DETECTION OF PAPER TYPE | CONFIRMATION OF EMPLOYED PAPER TYPE | CONFIRM WHETHER OR NOT THE EMPLOYED PAPER IS IDENTICAL TO THE SPECIFIED PAPER | DETECTION OF PAPER GLOSS |

FIG. 35

A RECORDING MEDIUM SUCH AS FD, CD-ROM, OR THE LIKE

| DIRECTORY INFORMATION |
|---|
| FIRST PROCESSING PROGRAM<br>A PROGRAM CODE GROUP CORRESPONDING TO THE STEPS OF THE FLOWCHART SHOWN IN FIG. 4 |
| SECOND PROCESSING PROGRAM<br>A PROGRAM CODE GROUP CORRESPONDING TO THE STEPS OF THE FLOWCHART SHOWN IN FIG. 5 |
| THIRD PROCESSING PROGRAM<br>A PROGRAM CODE GROUP CORRESPONDING TO THE STEPS OF THE FLOWCHART SHOWN IN FIG. 7 |
| FOURTH PROCESSING PROGRAM<br>A PROGRAM CODE GROUP CORRESPONDING TO THE STEPS OF THE FLOWCHART SHOWN IN FIG. 9 |
| FIFTH PROCESSING PROGRAM<br>A PROGRAM CODE GROUP CORRESPONDING TO THE STEPS OF THE FLOWCHART SHOWN IN FIG. 11 |
| SIXTH PROCESSING PROGRAM<br>A PROGRAM CODE GROUP CORRESPONDING TO THE STEPS OF THE FLOWCHART SHOWN IN FIG. 13 |
| SEVENTH PROCESSING PROGRAM<br>A PROGRAM CODE GROUP CORRESPONDING TO THE STEPS OF THE FLOWCHART SHOWN IN FIG. 16 |
| EIGHTH PROCESSING PROGRAM<br>A PROGRAM CODE GROUP CORRESPONDING TO THE STEPS OF THE FLOWCHART SHOWN IN FIG. 17 |
| NINTH PROCESSING PROGRAM<br>A PROGRAM CODE GROUP CORRESPONDING TO THE STEPS OF THE FLOWCHART SHOWN IN FIG. 20 |
| TENTH PROCESSING PROGRAM<br>A PROGRAM CODE GROUP CORRESPONDING TO THE STEPS OF THE FLOWCHART SHOWN IN FIG. 22 |
| ELEVENTH PROCESSING PROGRAM<br>A PROGRAM CODE GROUP CORRESPONDING TO THE STEPS OF THE FLOWCHART SHOWN IN FIG. 23 |
| TWELFTH PROCESSING PROGRAM<br>A PROGRAM CODE GROUP CORRESPONDING TO THE STEPS OF THE FLOWCHART SHOWN IN FIG. 24 |
| THIRTEENTH PROCESSING PROGRAM<br>A PROGRAM CODE GROUP CORRESPONDING TO THE STEPS OF THE FLOWCHART SHOWN IN FIG. 26 |
| FOURTEENTH PROCESSING PROGRAM<br>A PROGRAM CODE GROUP CORRESPONDING TO THE STEPS OF THE FLOWCHART SHOWN IN FIG. 28 |
| FIFTEENTH PROCESSING PROGRAM<br>A PROGRAM CODE GROUP CORRESPONDING TO THE STEPS OF THE FLOWCHART SHOWN IN FIG. 29 |
| SIXTEENTH PROCESSING PROGRAM<br>A PROGRAM CODE GROUP CORRESPONDING TO THE STEPS OF THE FLOWCHART SHOWN IN FIG. 30 |
| SEVENTEENTH PROCESSING PROGRAM<br>A PROGRAM CODE GROUP CORRESPONDING TO THE STEPS OF THE FLOWCHART SHOWN IN FIG. 31 |
| EIGHTEENTH PROCESSING PROGRAM<br>A PROGRAM CODE GROUP CORRESPONDING TO THE STEPS OF THE FLOWCHART SHOWN IN<br>FIGS. 33 AND 34 |

MEMORY MAP OF THE RECORDING MEDIUM

IMAGE FORMING APPARATUS AND METHOD THEREOF

BACKGROUND OF THE INVENTION

1. Field of the Invention

The present invention relates to inspection processing of image-output results output from an image forming apparatus.

2. Description of the Related Art

Heretofore, as a method for effectively performing inspection processing on printed matter (books), there has been a method for reading originals subjected to printing processing through an image reading apparatus, and extracting the attributes and attribute region of a read image, and determining inspection processing corresponding to the properties of the originals.

Also, as a method for effectively performing inspection processing, there has been a method for performing effective inspection processing by extracting the attributes and attribute region of a read image, and determining inspection processing and an inspection target region based on the extracted information thereof (e.g., see Japanese Patent Laid-Open No. 2001-96872).

Further, there has been a method for selecting an item whereby effects can be obtained with inspection work, according to the content of input original image data to inform an inspection apparatus of this. Specifically, this method is to realize efficiency of inspection work by issuing instructions so as not to perform (so as to omit) inspection work upon a page wherein advantages will not be obtained even if inspection work is performed thereupon (e.g., see Japanese Patent Laid-Open No. 2005-205852).

However, with the above-mentioned conventional techniques, there is a need to analyze a bitmap image read through an image reading apparatus to generate attribute information and an attribute region thereof. Therefore, there is a need to install image analyzing software in an inspection processing apparatus, resulting in a problem wherein the load of image analyzing processing increases in addition to the load of inspection processing.

Further, with the above-mentioned conventional techniques, part of inspection processing is omitted according to the content of the document. Therefore, while inspection efficiency is improved by omitting part of inspection processing as with Japanese Patent Laid-Open No. 2005-205852, inspection work is not performed upon all of inspection items.

Thus, there has been a problem wherein there is a possibility that inspection work will proceed without obtaining output results that the ordering party intends.

SUMMARY OF THE INVENTION

The present invention provides an arrangement for performing inspection processing effectively by selecting inspection processing to be performed in a thorough manner according to the properties of input printing information.

According to an embodiment of the present invention, an image forming apparatus configured to perform image-output of output information generated by analyzing input printing information, includes a selecting unit configured to analyze the input printing information, before image-output of the output information, selects an important processing item to be inspected and an inspection point, as to the image-output, a generating unit configured to generate inspection instruction information including the important processing item and the inspection point selected by the selecting unit to inspect output results of the image-output, and an output unit configured to output the inspection instruction information generated by the generating unit.

Further features and aspects of the present invention will become apparent from the following description of exemplary embodiments with reference to the attached drawings.

BRIEF DESCRIPTION OF THE DRAWINGS

FIG. 6 is a diagram illustrating an example of an inspection point table in which information relating to inspection referenced at the time of selecting inspection processing to be stored in a storage apparatus included in the image forming apparatus shown in FIG. 1 is registered.

FIG. 9 is a flowchart illustrating an example of a fourth data processing procedure of an image forming apparatus according to an embodiment of the present invention.

FIG. 12 is a diagram illustrating an example of an inspection instruction file which can be printed by the image forming apparatus according to the present embodiment.

FIG. 15 is a diagram illustrating an example of an inspection point table in which information relating to inspection referenced at the time of selecting inspection processing to be stored in a storage apparatus included in the image forming apparatus shown in FIG. 1 is registered.

FIG. 19 is a diagram illustrating an example of an inspection point table in which information relating to inspection referenced at the time of selecting inspection processing to be stored in a storage apparatus included in the image forming apparatus shown in FIG. 1 is registered.

FIG. 20 is a flowchart illustrating an example of a ninth data processing procedure of an image forming apparatus according to an embodiment of the present invention.

FIG. 21 is a diagram illustrating an example of an inspection instruction file which is printed by the image forming apparatus according to the present embodiment.

FIG. 27 is a diagram describing copy-forgery-inhibited pattern information, and an output form thereof, with the image forming apparatus according to the present embodiment.

FIG. 31 is a flowchart illustrating an example of a seventeenth data processing procedure of an image forming apparatus according to an embodiment of the present invention.

FIG. 32 is a diagram illustrating an example of an inspection point handling table managed by an image forming apparatus according to an embodiment of the present invention.

FIG. 35 is a diagram describing a memory map of a recording medium storing various types of data processing programs which can be read by an image forming apparatus according to the present invention.

DESCRIPTION OF THE EMBODIMENTS

Next, various embodiments for implementing the present invention will be described with reference to the drawings.
<Description of System Configuration>

First, description will be made regarding a configuration example of an image forming apparatus serving as an example of an output apparatus to which a first embodiment of the present invention can be applied. Note that a case will be shown here wherein an image forming apparatus according to the present embodiment has a RIP function for analyzing input printing information, e.g., page description language (PDL) data to generate output information of which the image-output can be performed from an engine.

Figure 1:
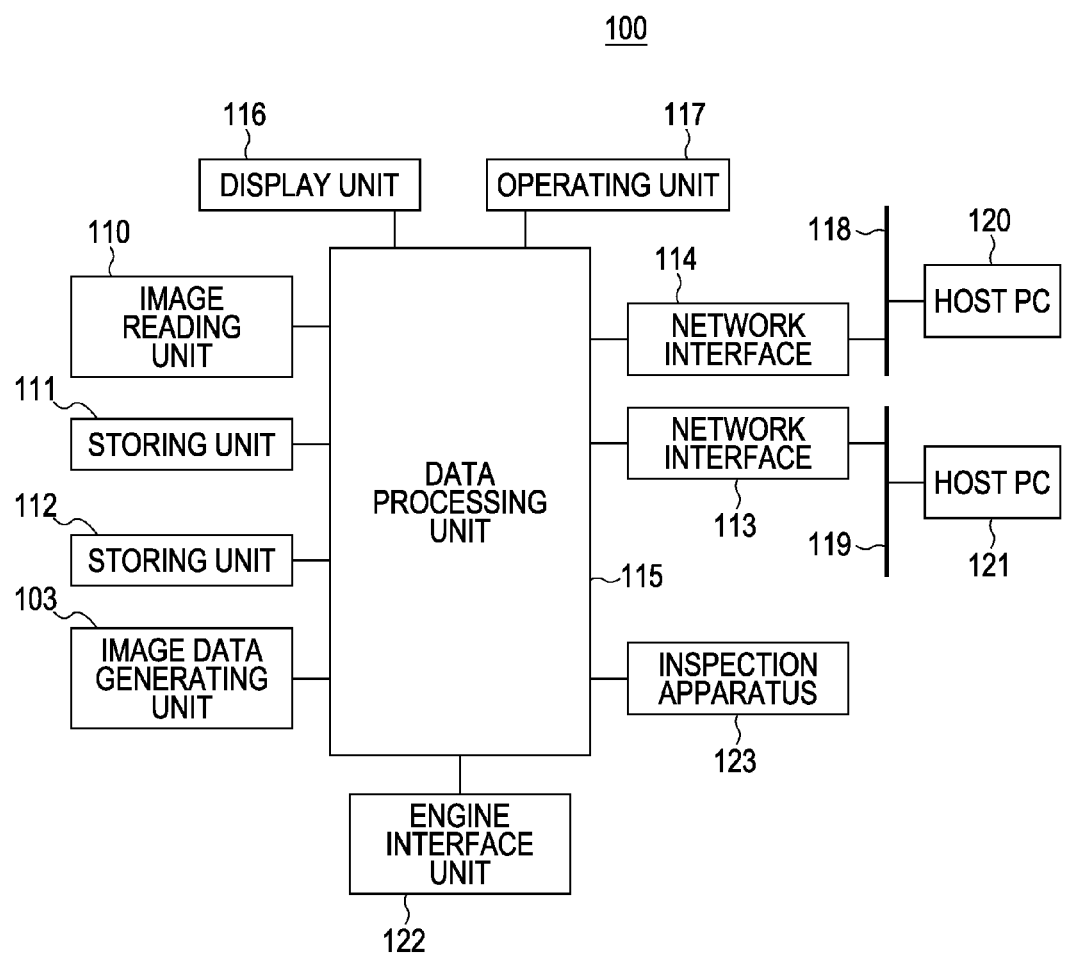
FIG. 1 is a block diagram illustrating a configuration of an image forming apparatus according to a first embodiment of the present invention.

FIG. 1 is a block diagram illustrating a configuration of the image forming apparatus according to the first embodiment of the present invention. An image forming apparatus 100 is realized with an MFP (Multi Function Peripheral) which is a complex apparatus for realizing multiple types of functions, for example. Also, the image forming apparatus 100 is connected to a host PC 120 through a network 118, and is connected to a host PC 121 through a network 119.

The image forming apparatus 100 particularly includes an image reading unit 110 for reading a paper document electronically, and a data processing unit 115 for executing image processing as to an image signal obtained from the image reading unit 110. Subsequently, this image signal can be transmitted to the host PC 121 serving as a management PC through the network 119.

The host PC 121 for performing management is configured of a general-use PC, internally includes various types of components such as an image storing unit, image processing unit, display unit, input unit, and so forth, but a part of the components thereof may be configured integral with the image forming apparatus 100.

Note that the networks 118 and 119 typically are one of the Internet, LAN, WAN, telecommunication line, dedicated digital circuit, ATM, frame relay circuit, communication satellite circuit, cable television circuit, wireless circuit for data broadcasting, and so forth. Also, it is sufficient for the networks 118 and 119 to be so-called communication networks realized by a combination of those as long as data transmission/reception can be performed.

Also, each of the host PC 120 and host PC 121 includes standard components included in a general-purpose computer. Examples of such standard components include a CPU, RAM, ROM, hard disk, external storage apparatus, network interface, display, keyboard, and mouse.

In FIG. 1, the image reading unit 110 including an original table and an auto document feeder (ADF) irradiates a stack or a single sheet of original image with a light source (not shown), and forms an original reflected image on a solid-state image-capturing device by using a lens. Thus, the image reading unit 110 obtains a raster-state image reading signal from the solid-state image-capturing device thereof as a raster image of predetermined density (e.g., 600 DPI).

Note that description will be made by exemplifying a paper document as a printed matter (book) which can be read by the image reading unit 110, but a printed matter (book) made up of a recording medium other than paper (e.g., a transparent original such as OHP sheet, film, or the like, cloth, or the like) may be employed as a reading object of the image reading unit 110. Also, the image forming apparatus 100 has a copy function for printing an image corresponding to an image reading signal on a recording medium through an engine interface unit 122.

Particularly, in the case of copying a single original image, this image reading signal is subjected to image processing at the data processing unit 115 to generate a recording signal, and this signal is printed on a recording medium through the engine interface unit 122. On the other hand, in the case of copying multiple original images, after a single image worth of recording signal is temporarily stored and held in a storing unit 111, this is output to an engine for forming an actual image through the engine interface unit 122 sequentially to print this on a recording medium.

On the other hand, the recording signal output from the host PC 120 is received at the data processing unit 115 through the network 118 and network interface 114, and the data processing unit 115 converts the recording signal thereof into raster data which can be recorded by the data processing unit 115. Subsequently, the raster data thereof is printed on a recording medium by the engine interface unit 122. Note that various types of printing control through the engine interface unit 122 are realized by the data processing unit 115.

An inspection apparatus 123 is connected to the image forming apparatus 100, and is an apparatus for inspecting a printed matter (book) in accordance with the content of an inspection instruction file generated by later-described processing in FIG. 4, for example.

Also, an image reading unit for recognizing a printed matter (book) is mounted on the inspection apparatus 123. Analysis results of a printed matter (book) analyzed by the image reading unit are subjected to inspection processing in accordance with the inspection instruction file.

Instructions of an operator to the image forming apparatus 100 are performed from an operating unit 117 made up of a key operating unit included in the image forming apparatus 100, and an operating unit 117 made up of a keyboard and mouse connected to the host PC 121, and this series of operations is controlled by a control unit (not shown) within the data processing unit 115. Also, status display of operating input, and display of image data during processing are performed by a display unit 116.

The storing unit 111 and a storing unit 112 are also controlled from the host PC 121, and exchange and control of data between the image forming apparatus 100 and host PC 121 are performed through the network interface 113 and network 119. Reference numeral 103 denotes an image data generating unit, which generates bitmap data based on input control data. Note that the image data generating unit 103 may be provided within the data processing unit 115.

Note that, with the image forming apparatus 100, a user interface for providing various types of operations and display for executing later-described various types of processing to a user is realized by the display unit 116 and operating unit 117.

Figure 2:
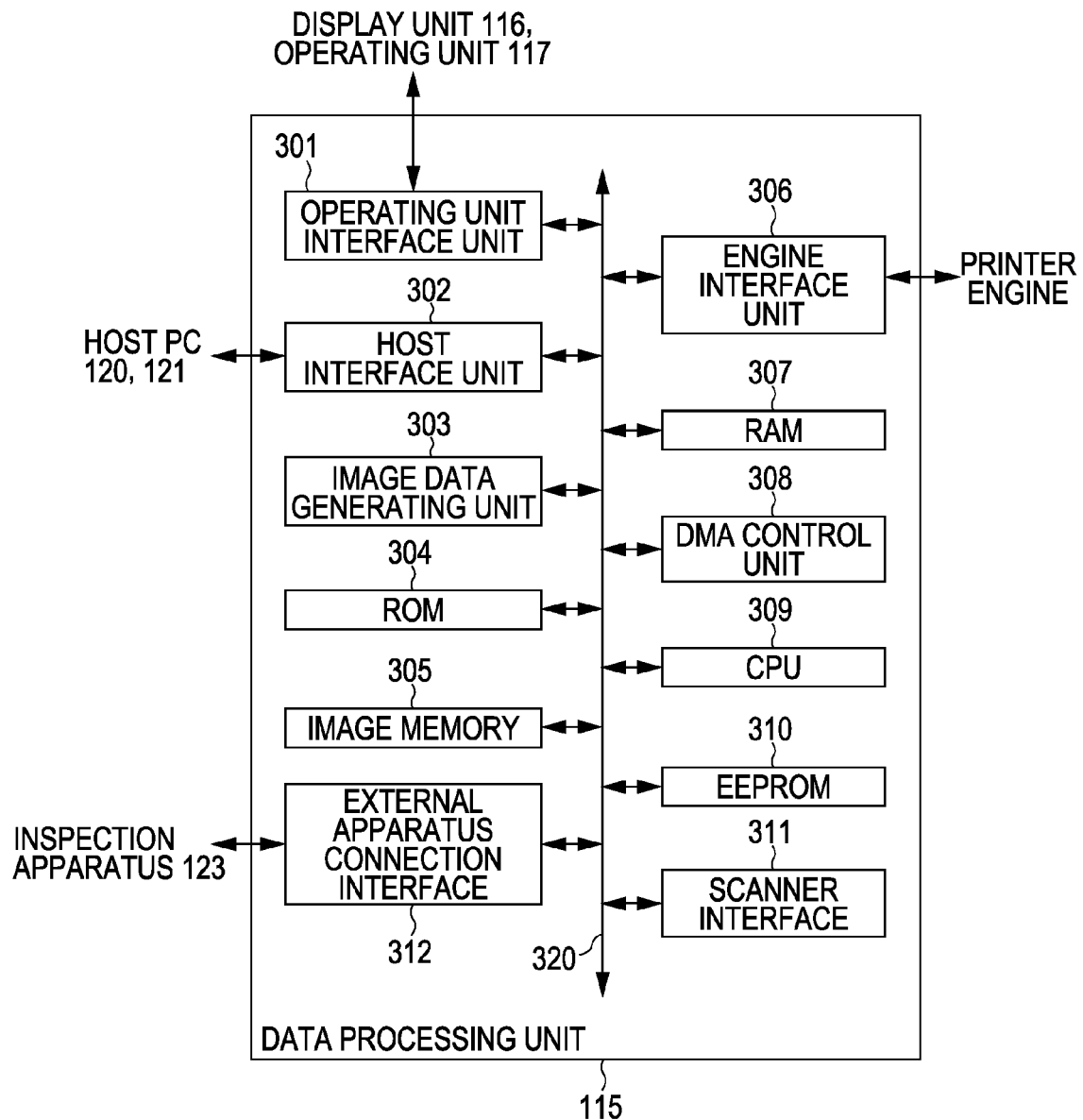
FIG. 2 is a block diagram illustrating a detailed configuration of a data processing unit shown in FIG. 1.

Next, the detailed configuration of the data processing unit 115 will be described with reference to FIG. 2. FIG. 2 is a block diagram illustrating the detailed configuration of the data processing unit 115 shown in FIG. 1. In FIG. 2, the data processing unit 115 includes a host interface unit 302. At the host interface unit 302 there is provided an input buffer (not shown) for inputting settings for instructing printing data and the operation of the apparatus transmitted from the host PCs 120 and 121.

Also, at the host interface unit 302 there is provided an output buffer (not shown) for temporarily holding output data including a signal and apparatus information data to be transmitted to a CPU 309. Also, the host interface unit 302 makes up an input/output unit of a signal and communication packet exchanged with the host PCs 120 and 121, and performs communication control with each device within the data processing unit 115.

Printing data input through the host interface unit 302 is provided to an image data generating unit 303. The input printing data is made up of PDL (Page Description Language) data, for example. The image data generating unit 303 analyzes the input printing data based on a predetermined analyzing unit (e.g., PDL analysis processing), generates an intermediate language from the analysis results thereof, and generates bitmap data which can be processed at a printing unit (printer engine).

Specifically, the image data generating unit 303 performs analysis of printing data, generation of intermediate language information according to the analysis thereof, and also performs rasterizing processing in parallel with the generation of intermediate language information.

This rasterizing processing includes conversion of display color RGB (additive mixture) included in printing data into YMCK (subtractive mixture) which an engine interface unit 306 can process. Also, the image data generating unit 303 performs processing such as conversion from character code included in printing data to font data such as a bit pattern, outline font, or the like stored beforehand, or the like.

Subsequently, the image data generating unit 303 generates bitmap data in page units or in band units with the rasterizing processing, subjects this bitmap data to pseudo-gradation processing employing a dithered pattern, and generates bitmap data which can be subjected to printing processing at the engine interface unit 306.

This generated bitmap data is stored in image memory 305 by the image data generating unit 303. Readout of the bitmap data stored in the image memory 305 is controlled by a DMA control unit 308, and control as to readout of the bitmap data from image memory 305 by the DMA control unit 308 is performed based on instructions from the CPU 309. The bitmap data read out from the image memory 305 is transferred to the printer engine through the engine interface unit 306 as a video signal.

At the engine interface unit 306 there are provided an output buffer (not shown) for temporarily holding a video signal to be transferred to the printer engine, and an input buffer (not shown) for temporarily holding a signal transmitted from the printer engine. Also, the engine interface unit 306 makes up an input/output unit of a signal exchanged with the printer engine, and performs communication control with the printer engine.

Various types of instructions such as instructions relating to a mode setting output by operating input from the operating unit 117 are input through an operating unit interface unit 301, and the operating unit interface unit 301 makes up an interface between the operating unit 117 and CPU 309. Note that instructions of various types of settings such as a mode setting or the like by operating input as to the engine interface unit 306 can be performed through the host interface unit 302 for performing two-way communication with an external connection apparatus (e.g., host PC 121). Also, similarly, instructions can be performed through the data processing unit 115 and network interface 113.

Also, a scanner interface unit 311 makes up an interface with the image reading apparatus, and performs reading of an original image. An external apparatus connection interface 312 makes up an interface for connecting the inspection apparatus 123.

The CPU 309 performs control as to each of the above-mentioned blocks depending on the mode instructed from the operating unit 117 or data processing unit 115, and this control is executed based on a control program stored in ROM 304. There is an OS (Operating System) which performs time-shared control of the control program stored in the ROM 304 in load module units called a task in accordance with a system clock. Also, the control program includes multiple load modules executed and controlled by the OS in function units. The control program including the load modules is stored in EEPROM (nonvolatile memory) 310 as necessary.

RAM 307 is employed as a work area for calculation processing by the CPU 309. The respective blocks including the CPU 309 are connected to a system bus 320. The system bus 320 is made up of an address bus and system bus.

Figure 3:
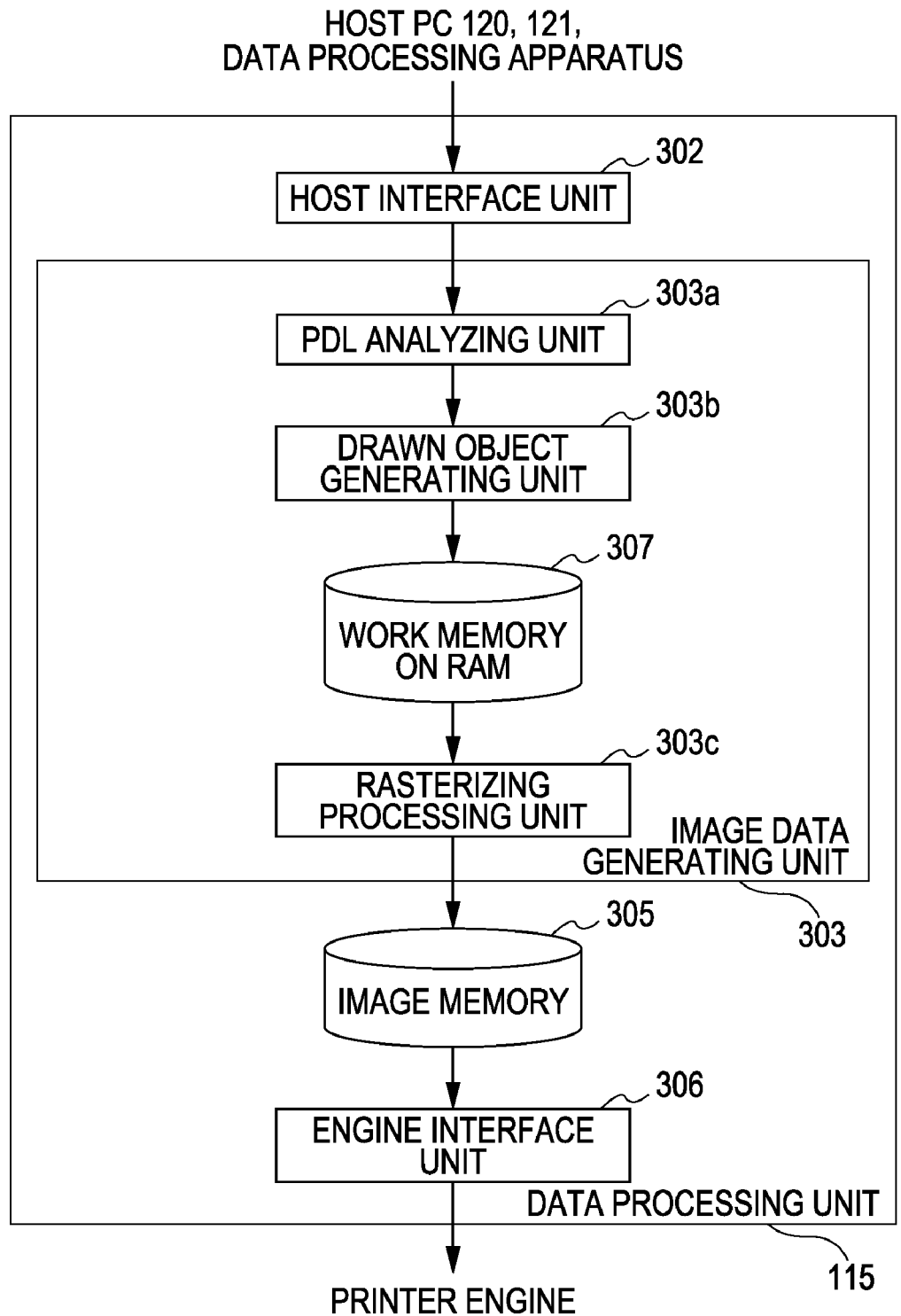
FIG. 3 is a block diagram describing function processing of the data processing unit 115 shown in FIG. 1.

Next, a processing route of input data at the data processing unit 115 will be described with reference to FIG. 3. FIG. 3 is a block diagram describing function processing of the data processing unit 115 shown in FIG. 1. In FIG. 3, printing data input through the host interface unit 302 from an external connection apparatus is subjected to command analysis by a PDL analyzing unit 303a.

Next, an intermediate language (DisplayList) is generated from analysis of the printing data at a drawing object generating unit 303b serving as an intermediate language generating unit, and is temporarily stored in work memory on the RAM 307.

Next, drawing memory is read out from the work memory on the RAM 307 as necessary, and rasterizing processing is performed at a rasterizing processing unit 303c.

Subsequently, image data ultimately recorded in a recording medium is rendered into a bitmap image, and is stored in the image memory 305, and is output to the engine interface unit 306, whereby recording to a recording medium is performed. With a printer control system thus configured, the following various types of flowcharts are realized by the program stored in the ROM 304 shown in FIG. 2.

Description will be made regarding a first inspection processing selection method of an inspection apparatus according to the present invention.

<Data Flow and Inspection Instruction File Generating Processing of Image Forming Apparatus>

Figure 4:
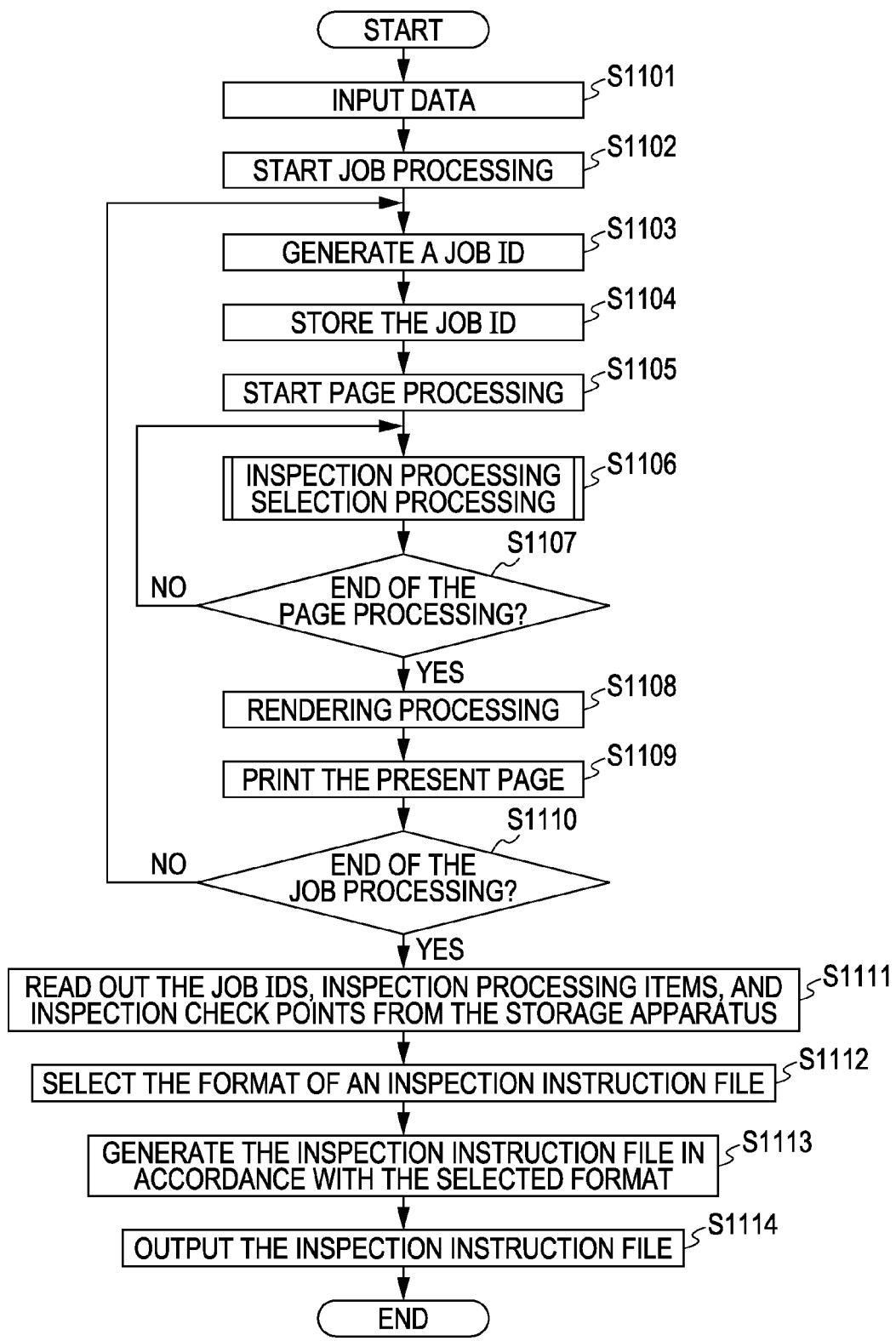
FIG. 4 is a flowchart illustrating an example of a first data processing procedure of an image forming apparatus according to an embodiment of the present invention.
Figure 5:
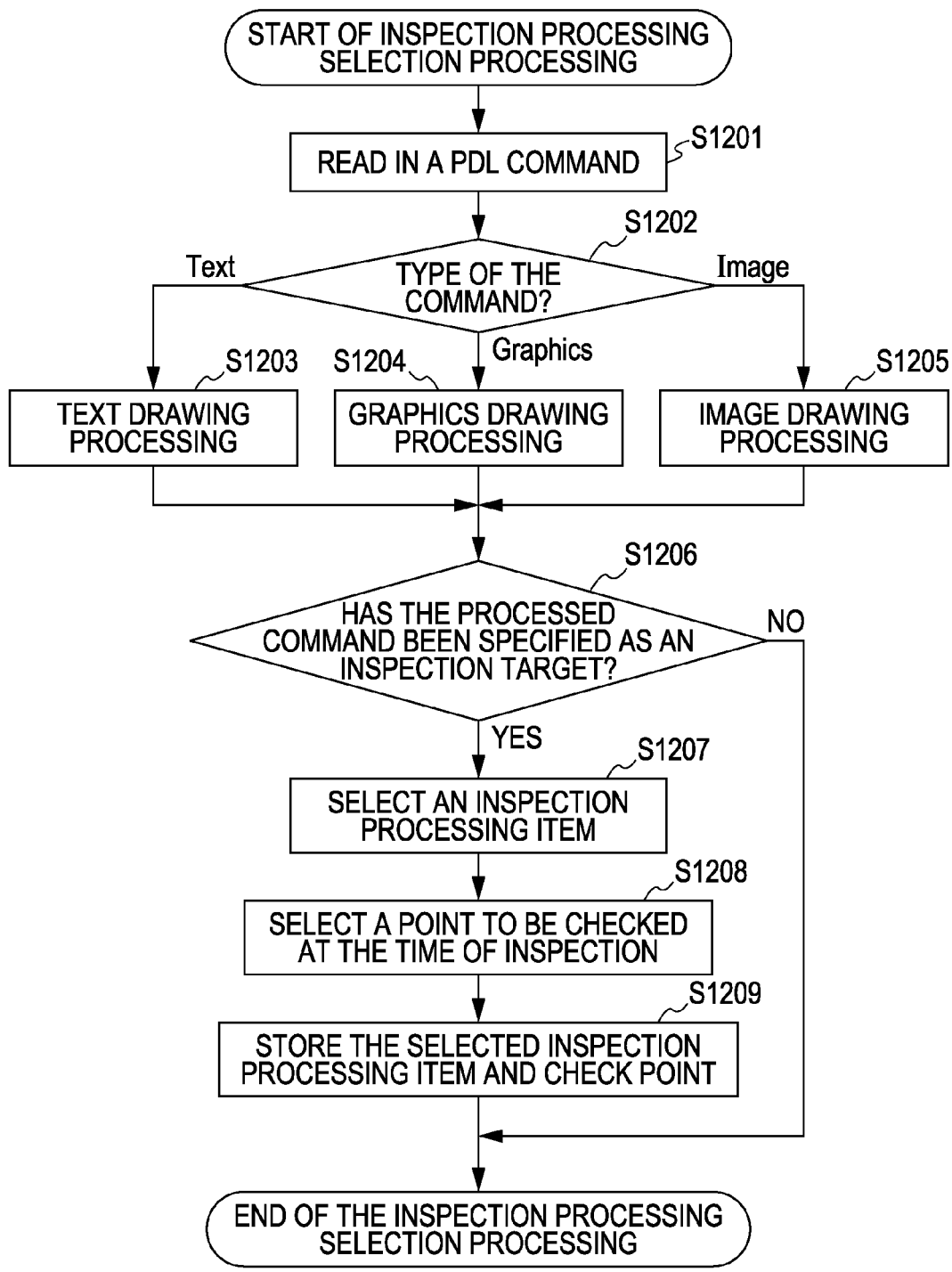
FIG. 5 is a flowchart illustrating an example of a second data processing procedure of the image forming apparatus according to an embodiment of the present invention.

FIGS. 4 and 5 are flowcharts illustrating examples of first and second data processing procedures with an image forming apparatus according to an embodiment of the present invention. The present example is a processing example wherein an inspection instruction file for performing inspection in a thorough manner is generated, in addition to image processing, and normal inspection processing. Also, FIG. 5 corresponds to inspection processing selection processing.

Note that reference symbols S1101 through S1114 denote the respective steps. Also, reference symbols S1201 through S1209 denote the respective steps, which correspond to detailed steps of S1106 shown in FIG. 4. Note that the respective steps are realized by the CPU 309 loading the control program stored in the ROM 305 to the RAM 307 to execute this.

FIG. 6 is a diagram illustrating an example of an inspection point table in which information relating to inspection referenced at the time of selecting inspection processing to be stored in a storage apparatus included in the image forming apparatus shown in FIG. 1 is registered. Note that an inspection point corresponds to a specific processing content as to an important inspection processing item selected for inspecting output results of image-output, and with the example shown in FIG. 6, whether there are omissions of characters, whether characters are smudged and illegible, whether characters are faded, and confirmation of color processing are shown.

As shown in FIG. 6, an inspection point table 1301 is an example made up of priority, processed command, important inspection processing item, inspection point, instruction content, and details of instruction content.

First, in step S1101, data is input to the image forming apparatus 100 from an external connection apparatus such as a host computer connected to the image forming apparatus 100 through the network interfaces 113 and 114, and external apparatus connection interface 312.

Subsequently, upon data being input in step S1101, in step S1102 the CPU 309 of the image forming apparatus 100 starts job processing.

Next, in step S1103, the CPU 309 generates a job ID for managing all of jobs to be processed at the image forming apparatus 100 after start of the job processing.

Subsequently, in step S1104, the CPU 309 stores the job ID generated in step S1103 in the storage apparatus. Let us say that the storage apparatus mentioned here is the RAM 307, but the storage apparatus may be another recording medium.

Next, in step S1105, the CPU 309 starts analysis processing of PDL data included in a page.

Subsequently, in step S1106, the CPU 309 performs inspection processing selection processing shown in FIG. 5 in detail.

Next, in step S1107, the CPU 309 determines whether or not the analysis processing of all of the PDL commands included in the page. In the case of the CPU 309 determining that the analysis processing of all of the PDL commands included in the page has been completed, the CPU 309 proceeds to step S1108, and in the case of the CPU 309 determining that the analysis processing of all of the PDL commands included in the page has not been completed, the CPU 309 returns to step S1106, and repeats the same processing.

Subsequently, in the case of the CPU 309 determining in step S1107 that the analysis processing of all of the PDL commands included in the page has been completed, in step S1108 the CPU 309 executes rendering processing on the RAM 307 to generate a bitmap image.

Next, in step S1109, the CPU 309 outputs the bitmap image generated in step S1108 to the printer engine, thereby executing printing processing of the page. Subsequently, in step S1110, the CPU 309 determines whether or not the printing processing in step S1109 as to all of the pages has been completed. In the case of the CPU 309 determining that the printing processing of all of the pages has been completed, the CPU 309 proceeds to step S1111, and in the case of the CPU 309 determining that the printing processing of all of the pages has not been completed, the CPU 309 repeats the processing in steps S1103 through S1110 until the processing of all of the pages is completed.

Subsequently, in step S1111, the CPU 309 reads out the job IDS generated in step S1103 and stored in the storage apparatus in step S1104, inspection processing items and inspection points stored in later-described step S1209 in FIG. 5, from the storage apparatus.

First, in step S1112, the CPU 309 selects a format for generating the job ID and information relating to inspection read out in step S1111 as a file. There can be conceived a PDL for printing inspection information, a JDF whereby instructions as to an inspection apparatus can be described, and so forth as formats of the file.

Next, in step S1113, the CPU 309 converts the job ID and information relating to inspection read out in step S1111 into the format selected in step S1112 to generate an inspection instruction file. The inspection instruction file serves as inspection instruction information which the engine outputs.

Subsequently, in step S1114, the CPU 309 outputs the electronic file generated in step S1113 outside the image forming apparatus 100, an ends the present processing.

Note that, with regard to an output method, the electronic file may be transmitted through a network, or the electronic file may be subjected to printing processing such as shown in later-described second embodiment.

Next, a processing flow of inspection processing selection will be described based on FIG. 5. First, in step S1201, the CPU 309 reads in a PDL command within input data. Subsequently, in step S1202, the CPU 309 determines the type of PDL command currently being subjected to the analysis processing. In the case of determining that the PDL command is a text processing command, the CPU 309 proceeds to step S1203.

Also, in the case of determining that the PDL command is a graphics processing command, the CPU 309 proceeds to step S1204. Also, in the case of determining that the PDL command is an image processing command, the CPU 309 proceeds to step S1205.

Subsequently, in step S1203, the CPU 309 executes processing for drawing a text in accordance with the PDL command. Such processing includes readout of font data, change in a font size, alternate font selection processing in a case where a specified font does not exist, or the like.

Also, in step S1204, the CPU 309 executes processing for drawing a graphics in accordance with the PDL command. Such processing includes smoothing of a graphics, line generation processing, or the like.

Further, in step S1205, the CPU 309 executes processing for drawing a bitmap image. Such processing includes enlargement/reduction processing of a bitmap image, decompression processing of compressed data, or the like.

Next, in step S1206, the CPU 309 determines whether or not the command read in step S1201, and subjected to the analysis processing in steps S1202 through S1205, is specified as an object to be inspected in a thorough manner. In the case of determining that the command is specified as a target to be inspected in a thorough manner, the CPU 309 proceeds to step S1207, and in the case of determining that the command is not specified as a target to be inspected in a thorough manner, the CPU 309 ends the present processing, and proceeds to step S1107 shown in FIG. 4.

Note that FIG. 6 illustrates an example of an inspection point table referenced at the time of determining that the command is specified as a target to be inspected in a thorough manner. Inspection information for executing inspection processing in a thorough manner is registered in such a table 1301.

Subsequently, in step S1207, in the case of determining in step S1206 that the command is specified as a target to be inspected in a thorough manner, the CPU 309 references the inspection point table 1301 of which an example is shown in FIG. 6 to select an inspection processing item to be executed. The inspection processing item corresponds to an important processing item to be determined to be important by an inspector.

Next, in step S1208, the CPU 309 references the inspection point table 1301 of which an example is shown in FIG. 6 to select an inspection point to be confirmed in a thorough manner at the time of inspection.

Subsequently, in step S1209, the CPU 309 stores the inspection processing item and inspection point selected in steps S1207 and S1208 in the storage apparatus, and ends the present processing.

Note that, with the present embodiment, description has been made regarding a case wherein an important processing item to be inspected and inspection point are selected in page units, but an arrangement may be made wherein an inspection point is selected in job units.

<Storing Processing of Inspection Instruction File>

Figure 7:
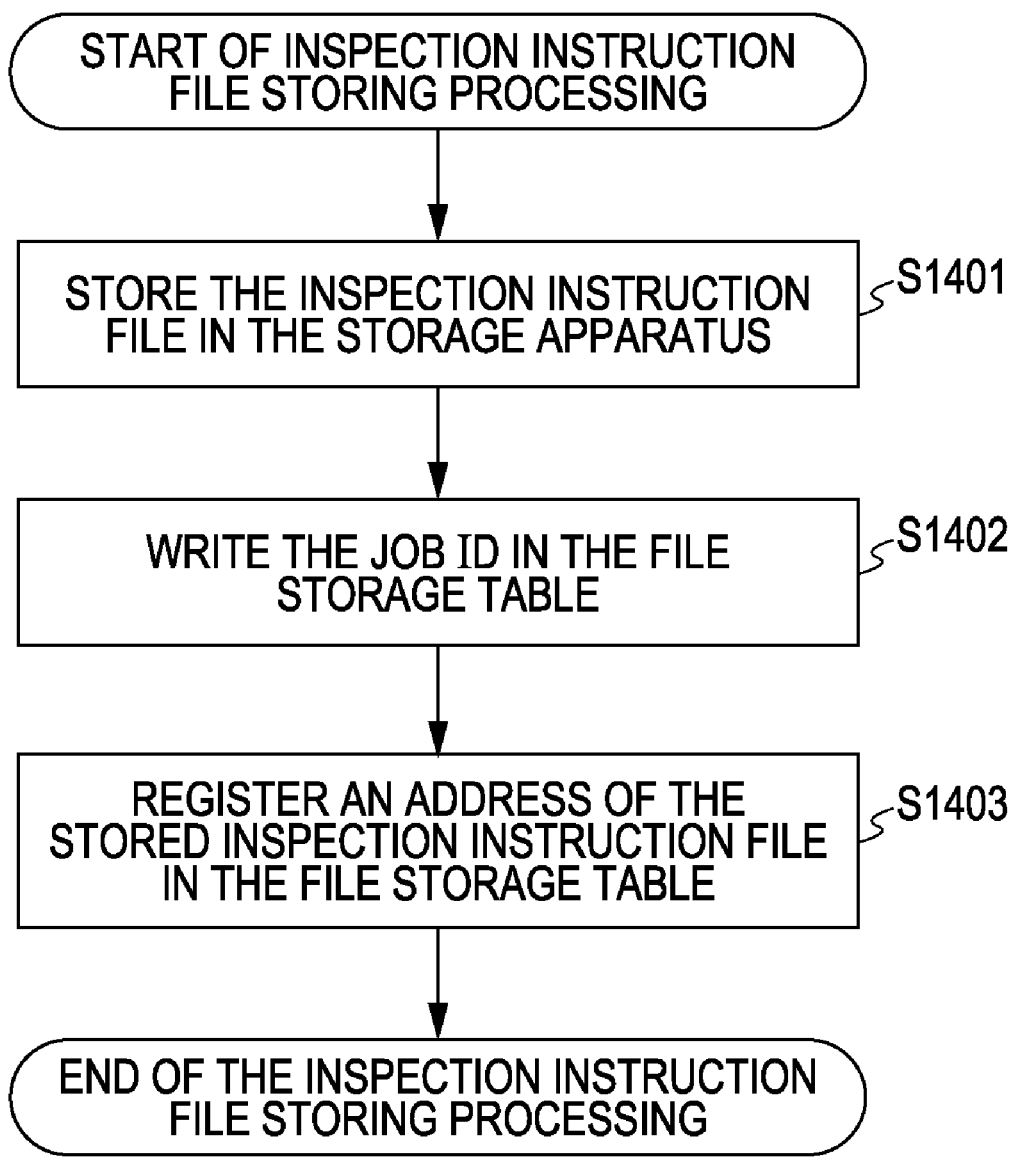
FIG. 7 is a flowchart illustrating an example of a third data processing procedure of an image forming apparatus according to an embodiment of the present invention.

FIG. 7 is a flowchart illustrating an example of a third data processing procedure of an image forming apparatus according to an embodiment of the present invention. The present example is a processing example wherein an inspection instruction file determined at the inspection selection processing is stored in the storage apparatus.

Note that reference symbols S1401 through S1403 denote the respective steps, which correspond to detailed steps of S1106 shown in FIG. 4. Note that the respective steps are realized by the CPU 309 loading the control program stored in the ROM 305 to the RAM 307 to execute this.

Figure 8:
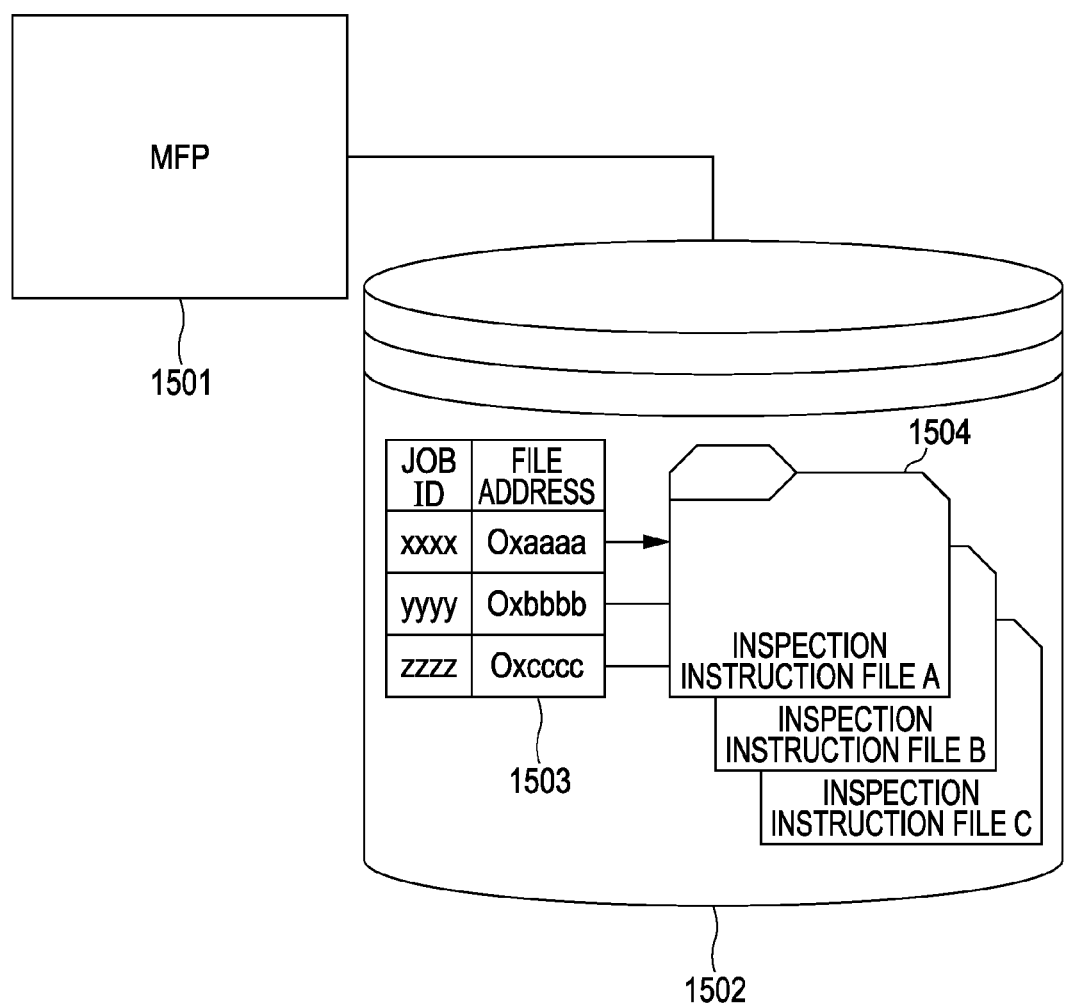
FIG. 8 is a diagram describing processing for storing an inspection instruction file in the storage apparatus with the image forming apparatus according to the present embodiment.

FIG. 8 is a diagram describing processing for storing an inspection instruction file in the storage apparatus with the image forming apparatus according to the present embodiment.

First, in step S1401, the CPU 309 stores an inspection instruction file in the storage apparatus. FIG. 8 illustrates an example wherein the storage apparatus is a nonvolatile storage apparatus 1502.

In step S1402, the CPU 309 writes the job ID in a file storage table in which the job IDs included in the storage apparatus 1502 and the storage addresses of inspection instruction files are registered.

Subsequently, in step S1403, the CPU 309 registers the address of the inspection instruction file stored in the storage apparatus 1502 in step S1401 in the file storage table in which the job IDs included in the storage apparatus and the storage addresses of inspection instruction files are registered, and ends the present processing. The processing for registering the address of an inspection instruction file will be described further below with reference to FIG. 8.

In FIG. 8, reference numeral 1501 denotes an image forming apparatus. The image forming apparatus 1501 corresponds to the image forming apparatus 100 shown in FIG. 1. Reference numeral 1502 denotes the nonvolatile storage apparatus, which is included in the image forming apparatus 1501. Reference numeral 1503 denotes the file storage table, which stores the job ID and the storage address of the inspection instruction file in steps S1402 and S1403. Reference numeral 1504 denotes the inspection instruction file.

<Inspection Instruction File Providing Processing as to Inspectors>

FIG. 9 is a flowchart illustrating an example of a fourth data processing procedure of an image forming apparatus according to an embodiment of the present invention. The present example is a processing example wherein a panel UI belonging to the image forming apparatus is employed to provide the inspection instruction file generated in FIG. 4 to an inspection apparatus or operator.

Note that reference symbols S1601 through S1605 denote the respective steps, which are realized by the CPU 309 loading the control program stored in the ROM 305 to the RAM 307 to execute this.

FIGS. 10A through 10D are diagrams illustrating an example of an operating screen of the panel UI included in the image forming apparatus according to the present embodiment. The present example is arranged wherein selecting a tab sheet enables a lower-layer menu to be opened, whereby settings relating to each tab sheet and confirmation of setting content can be performed.

First, in step S1601, the user employs a panel UI 1701 included in the image forming apparatus 100 to select inspection processing settings through an inspection processing setting button 1701A. The panel UI 1701 according to the inspection processing settings has a configuration shown in FIG. 10A. Upon the inspection processing setting button 1701A being selected, the panel UI display 1701 is changed to a panel UI display 1702 shown in FIG. 10B under the display control of the CPU 309.

Figure 10A:
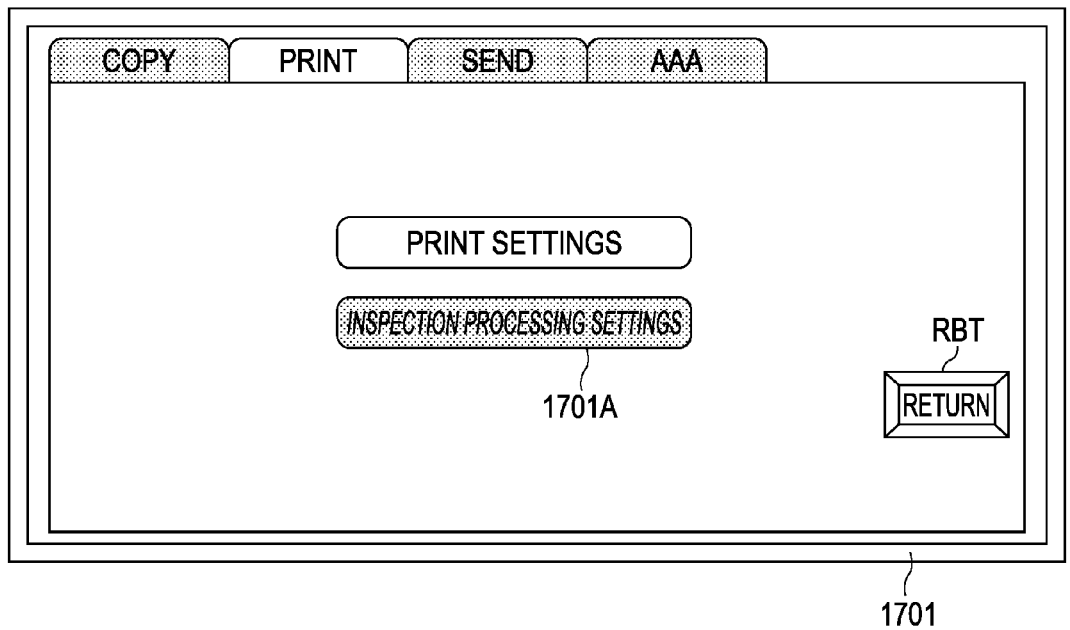
FIG. 10A is a diagram illustrating an example of a panel UI operating screen included in the image forming apparatus according to the present embodiment.
Figure 10B:
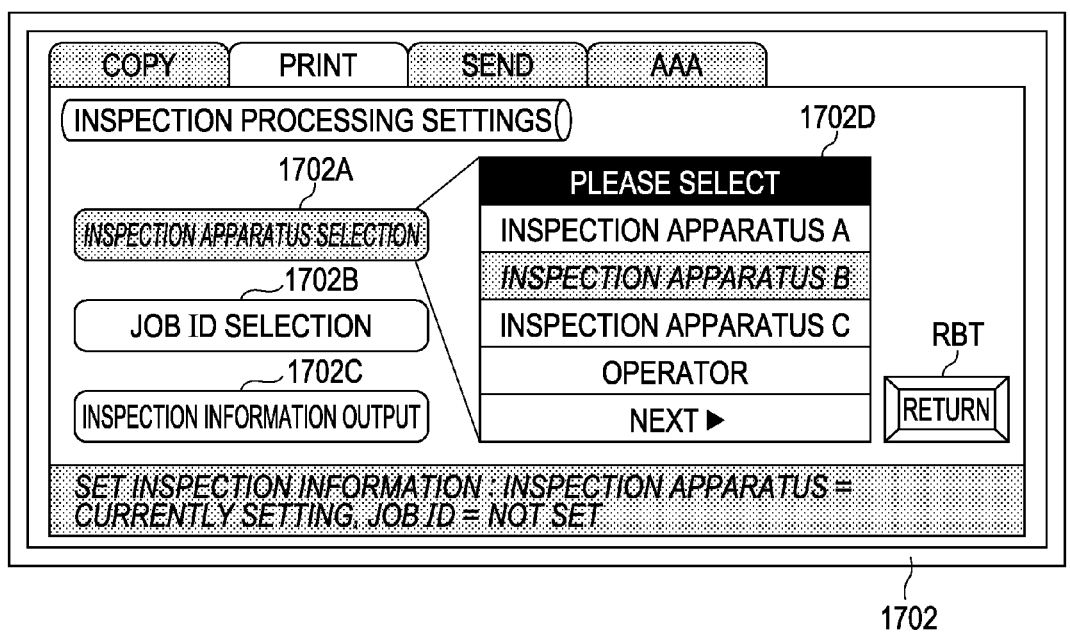
FIG. 10B is a diagram illustrating an example of the panel UI operating screen included in the image forming apparatus according to the present embodiment.

Next, in step S1602, the user selects an inspection apparatus to be inspected, job ID, and inspection information output method as to the panel UI display 1702 shown in FIG. 10B through buttons 1702A through 1702C, respectively.

For example, in the case of the user selecting the button 1702A as to the panel UI display 1702 shown in FIG. 10B, a menu 1702D for determining an inspection apparatus is displayed under the display control of the CPU 309.

Figure 10C:
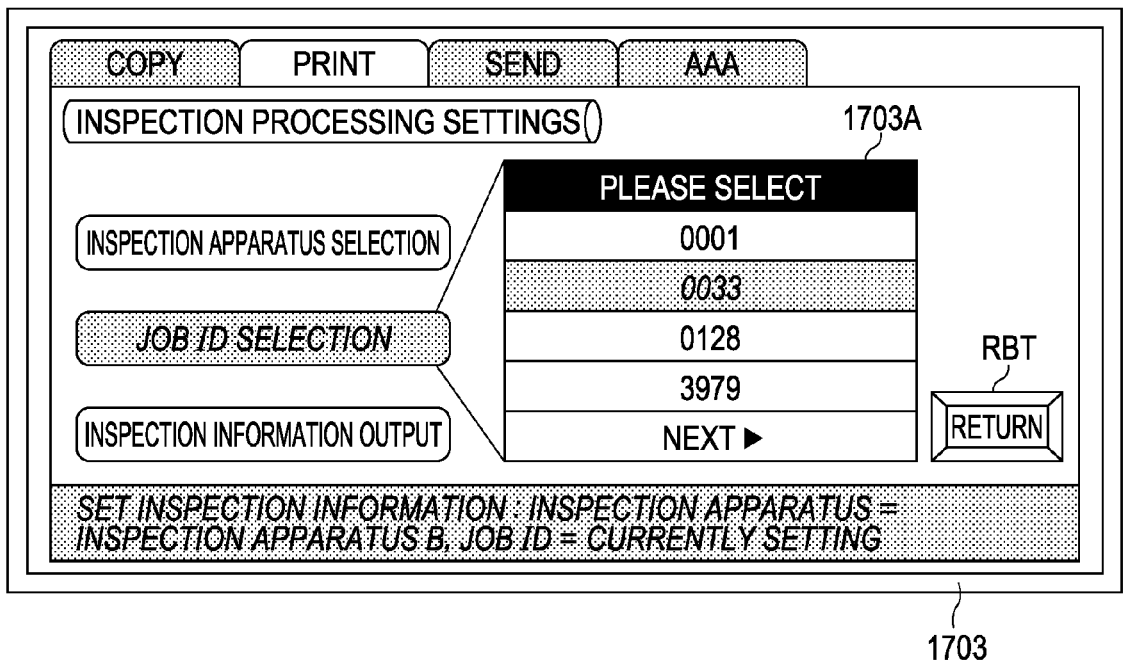
FIG. 10C is a diagram illustrating an example of the panel UI operating screen included in the image forming apparatus according to the present embodiment.

Also, in the case of the user selecting the button 1702B as to the panel UI display 1702 shown in FIG. 10B, a menu 1703A for selecting a job ID is displayed on panel UI display 1703 shown in FIG. 10C under the display control of the CPU 309.

Figure 10D:
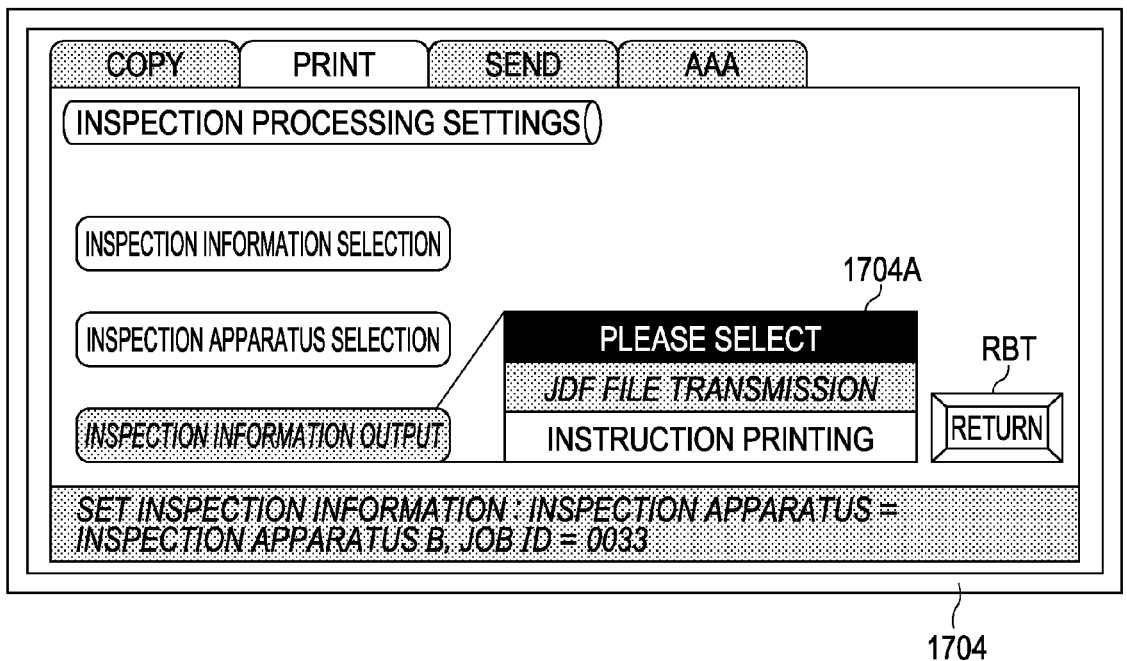
FIG. 10D is a diagram illustrating an example of the panel UI operating screen included in the image forming apparatus according to the present embodiment.

Also, in the case of the user selecting the button 1702C as to the panel UI display 1702 shown in FIG. 10B, a menu 1704A for selecting an inspection information output method is displayed on panel UI display 1704 shown in FIG. 10D under the display control of the CPU 309. Now, let us say that the user selects "JDF file transmission". Also, in the case of the user selecting "JDF file transmission", a JDF file to be generated is transmitted externally.

Note that, in FIGS. 10A through 10D, reference symbol RBT denotes a button, which serves as a button for returning to the display of the upper hierarchical level. Also, the panel UIs shown in FIGS. 10A through 10D are examples, the forms of the panel UIs are not restricted to those in the present embodiment as long as the same functions can be executed.

Next, in step S1603, the CPU 309 reads out inspection information corresponding to the job ID selected in accordance with the UI instructions in step S1602 from the storage region. Subsequently, in step S1604, the CPU 309 performs processing converts the inspection information read out from the storage apparatus 1502 in step S1603 into a format which can be interpreted by the inspection apparatus selected in accordance with the UI instructions in step S1602.

Subsequently, in step S1605, the CPU 309 outputs the inspection information converted into the appropriate format in step S1604 outside the image forming apparatus, and ends the present processing. Executing this processing enables generation of an inspection instruction file for providing inspection content and inspection point for performing inspection processing in a thorough manner, and providing to the inspector.

Specifically, an instruction for inspection work can be generated by taking into consideration the experience of the operator for performing inspection, notes for each drawing object accumulated as knowledge, the peculiarity of the image forming apparatus, or the capability of the inspection apparatus. Also, a point for improving the precision of inspection work can be restricted, and occurrence of oversights due to the operator or the capability difference of the employed inspection apparatus can be reduced without deteriorating inspection efficiency.

A second embodiment according to the present invention will be described below with reference to the drawings.

Figure 11:
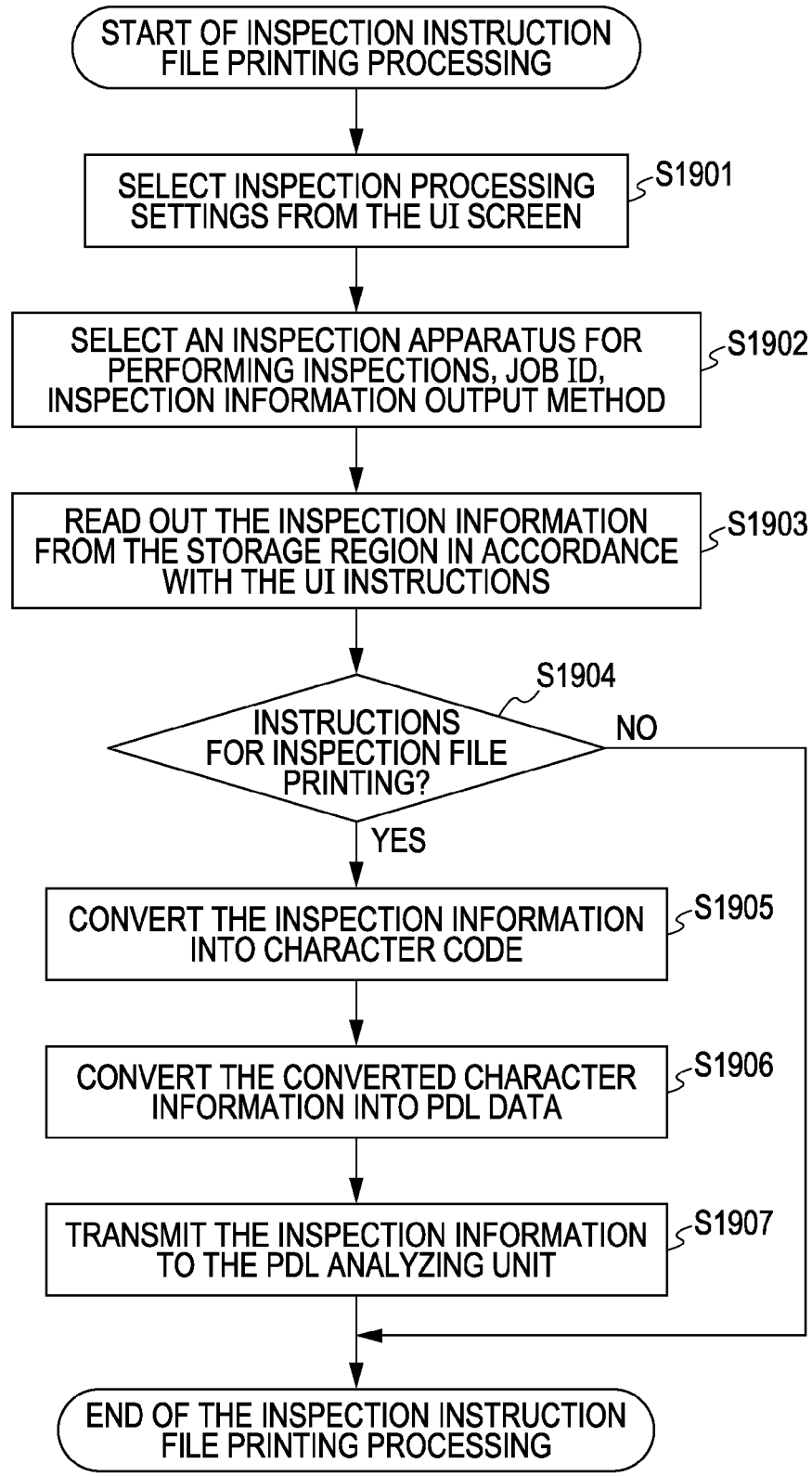
FIG. 11 is a flowchart illustrating an example of a fifth data processing procedure of an image forming apparatus according to an embodiment of the present invention.

FIG. 11 is a flowchart illustrating an example of a fifth data processing procedure of an image forming apparatus according to an embodiment of the present invention. The present example is an example wherein an inspection instruction file is subjected to printing processing. Note that reference symbols S1901 through S1907 denote the respective steps, which are realized by the CPU 309 loading the control program stored in the ROM 305 to the RAM 307 to execute this.

FIG. 12 is a diagram illustrating an example of an inspection instruction file which can be printed by the image forming apparatus according to the present embodiment. With the present example, an inspection instruction 2001 is printed by the printer engine connected to the image forming apparatus through the engine interface unit 122 shown in FIG. 1. Now, let us say that later-described panel UI examples are the same as FIGS. 10A through 10D.

First, in step S1901, the user selects the inspection processing setting button 1701A shown in FIG. 10A through the panel UI included in the image forming apparatus 100.

Next, in step S1902, the user selects the button 1702A shown in FIG. 10B to select an inspection apparatus for performing inspection. Similarly, the user selects the button 1702B shown in FIG. 10B to select a job ID from the menu 1703A shown in FIG. 10C. Further, the user selects the button 1702C shown in FIG. 10B to select an inspection information output method from the menu 1704A shown in FIG. 10D. Now, let us say that "instruction printing" is selected, unlike with the first embodiment.

Next, in step S1903, the CPU 903 reads out the inspection information corresponding to the selected job ID from the storage region of the storage apparatus 1502 in accordance with the instructions from the user as to the panel UI in step S1902.

Next, in step S1904, the CPU 903 determines whether or not inspection instruction file printing is specified as the selected inspection information output method in accordance with the instructions from the user as to the panel UI in step S1902. Here, in the case of determining that other than the printing is selected as the selected inspection information output method, the CPU 903 ends the present processing.

On the other hand, in the case of determining in step S1904 that the instructions are to print an inspection instruction file as the selected inspection information output method, the CPU 309 proceeds to step S1905.

Subsequently, in step S1905, the CPU 309 converts the inspection information read out in step S1903 into character code which the PDL can interpret. With the present embodiment, let us say that the inspection information is converted into JIS code or the like for example, but may be another code.

Next, in step S1906, the CPU 309 converts the text information converted into character code which the PDL can interpret in step S1905 into PDL data. Subsequently, in step S1907, the CPU 309 transmits the inspection information converted into PDL data in step S1906 to the PDL analyzing unit 303a of the image forming apparatus, executes printing processing, and ends the present processing. Thus, the inspection instruction shown in FIG. 12 can be printed out.

Executing the above-mentioned processing enables inspection content and inspection point for performing inspection processing in a thorough manner to be printed, and provided to the operator for performing inspection processing. That is to say, oversights during inspection processing can be reduced by instructing the content of inspection work regardless of the learning level of the operator.

A third embodiment according to the present invention will be described below with reference to the drawings.

<Feedback Method of Inspection Effects>

Figure 13:
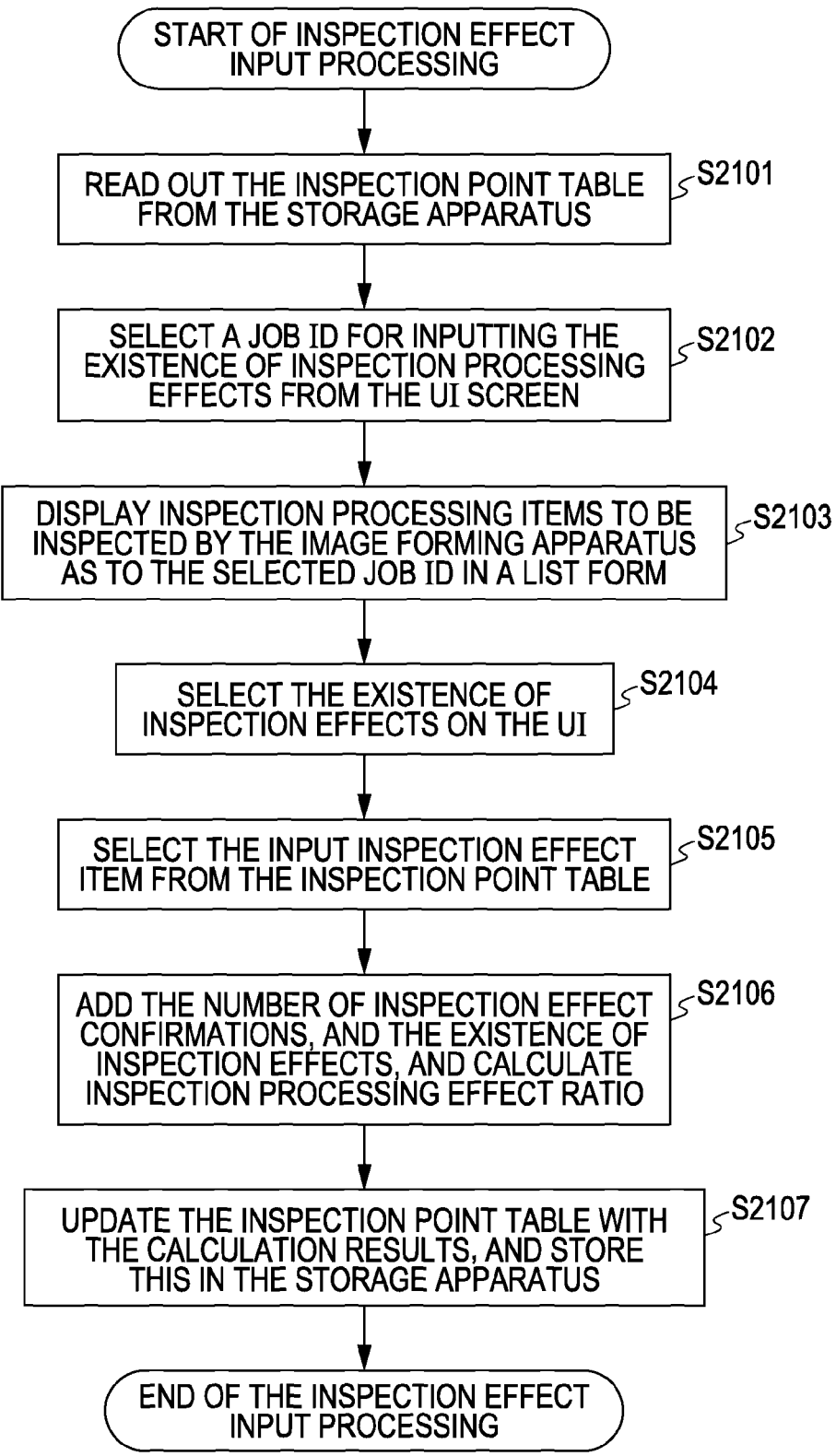
FIG. 13 is a flowchart illustrating an example of a sixth data processing procedure of an image forming apparatus according to an embodiment of the present invention.

FIG. 13 is a flowchart illustrating an example of a sixth data processing procedure of an image forming apparatus according to an embodiment of the present invention. The present example is an example wherein the panel UI included in the image forming apparatus is employed to feed back effects to the image forming apparatus. Note that reference symbols S2101 through S2107 denote the respective steps, which are realized by the CPU 309 loading the control program stored in the ROM 307 to the RAM 305 to execute this.

Figure 14A:
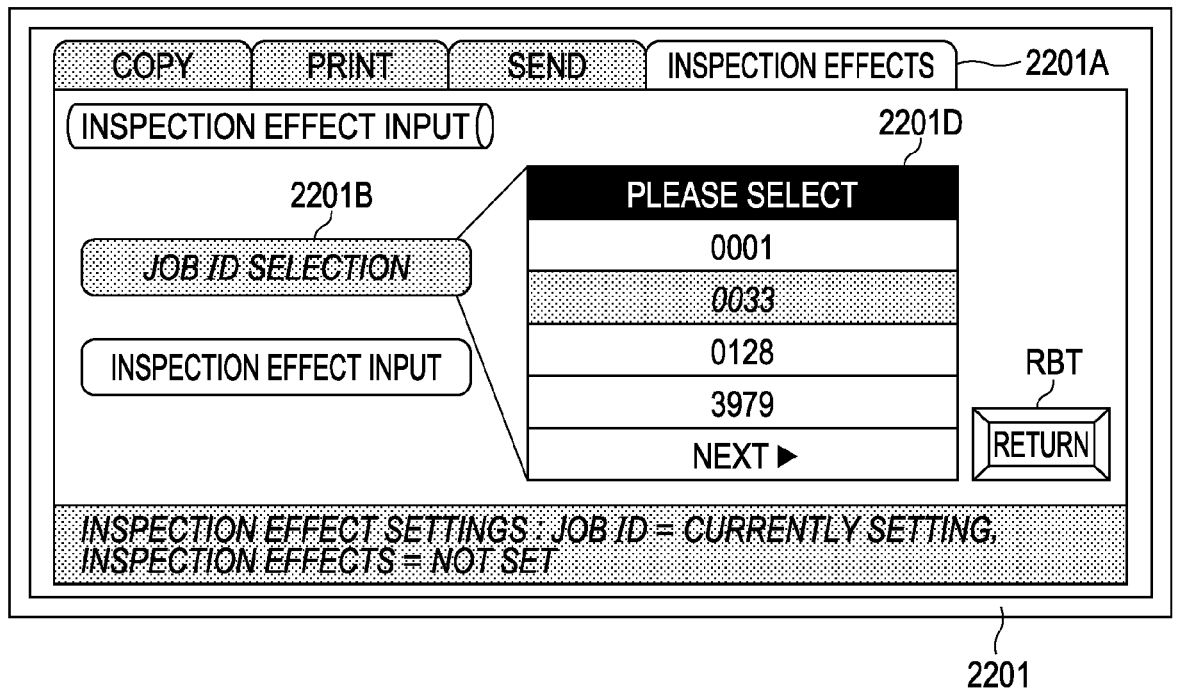
FIG. 14A is a diagram illustrating an example of a panel UI operating screen included in the image forming apparatus according to the present embodiment.
Figure 14B:
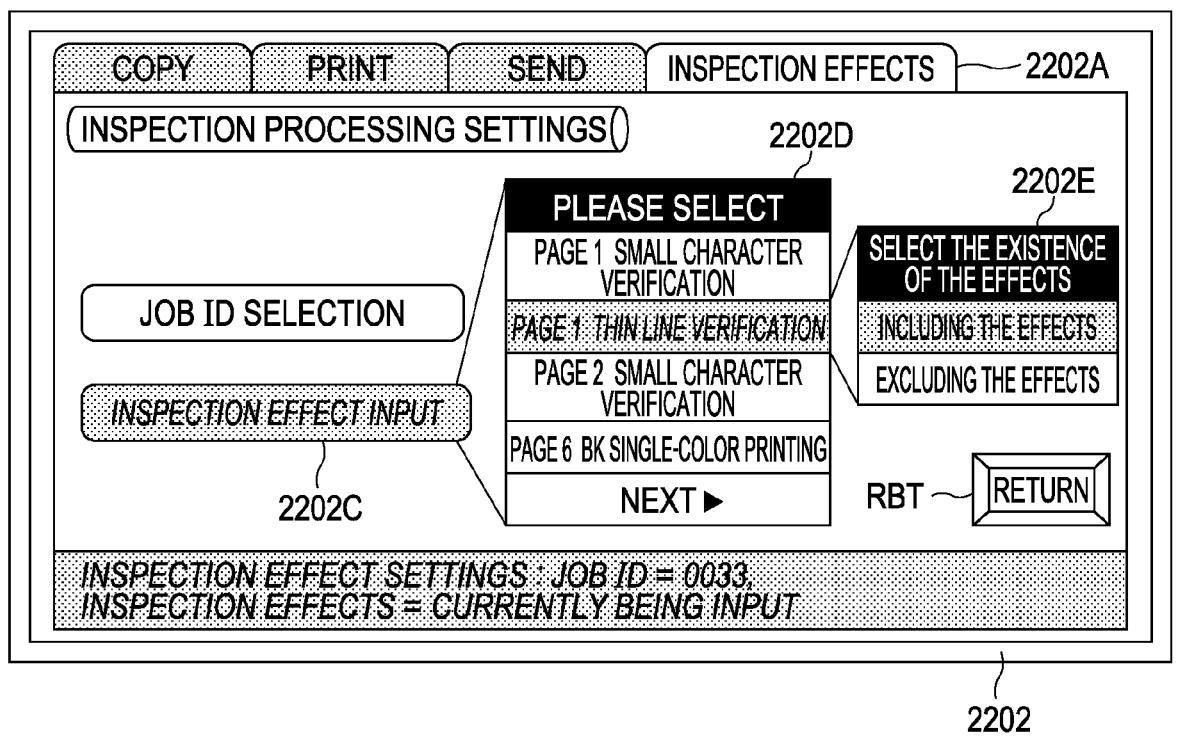
FIG. 14B is a diagram illustrating an example of the panel UI operating screen included in the image forming apparatus according to the present embodiment.

FIGS. 14A and 14B are diagrams illustrating an example of a panel UI operating screen included in the image forming apparatus according to the present embodiment. The present example is arranged wherein selecting a tab sheet enables a lower-layer menu to be opened, whereby settings relating to each tab sheet and confirmation of setting content can be performed. Note that, in FIG. 14A, reference symbol 2201A denotes an inspection effects tab. Also, in FIG. 14B, reference symbol 2202A denotes an inspection effects tab.

FIG. 15 is a diagram illustrating an example of an inspection point table in which information relating to inspection referenced at the time of selecting inspection processing to be stored in the storage apparatus included in the image forming apparatus shown in FIG. 1 is registered. As shown in FIG. 15, an inspection point table 2301 is an example made up of priority, processed command, important inspection processing item, inspection point, instruction content, details of instruction content, number of inspection selections, number of inspection effect confirmations, including inspection effects, and inspection effect ratio.

First, in step S2101, the CPU 309 reads out the inspection point table 2301 holding inspection information to be subjected to inspection processing in a thorough manner as a list from the storage apparatus 1502. Next, in step S2102, as shown in FIG. 14A, the user employs a panel UI 2201 included in the image forming apparatus 100 to select a job ID for inputting whether there are inspection processing effects.

Note that, in FIG. 14A, job ID selection is displayed in an effective state through a menu 2201D to be displayed by the user selecting a button 2201B.

Next, in step S2103, upon the user selecting a button 2202C, the CPU 309 specifies to perform inspection processing in a thorough manner at the time of performing image processing having the job ID selected in step S2102, and reads out the inspection information stored in the storage apparatus 1502. Subsequently, as shown in FIG. 14B, the CPU 309 displays the readout inspection information through a menu 2202E of a panel UI 2202 in a list.

Next, in step S2104, the user selects inspection information displayed on the panel UI 2202 in a list in step S2103 to input whether there are inspection effects at the time of performing inspection processing in accordance with each of instructions. Specifically, the CPU 309 displays a menu 2202D shown in FIG. 14B, and the user operates a menu 2202E to input whether there are inspection effects at the time of performing inspection processing. Here, whether there are inspection effects at the time of performing input inspection processing corresponds to inspection results.

Next, in step S2105, the CPU 309 selects the inspection item input in step S2104 from the inspection point table. Subsequently, in step S2106, the CPU 309 adds the number of inspection effect confirmations and whether there are inspection effects selected in step S2105 in accordance with the input in step S2104. Further, the CPU 309 calculates the effect ratio of inspection processing. Subsequently, the CPU 309 registers information relating to the calculated inspection in the inspection point table in accordance with the data format shown in FIG. 15. The example shown in FIG. 15 is an example wherein the number of inspection effect confirmations, whether there are inspection effects, and effect ratio of inspection processing are stored and managed.

Next, in step S2107, the CPU 309 stores the inspection point table of which the number of inspection effect confirmations, whether there are inspection effects, and inspection effect ratio are updated in the storage apparatus 1502, thereby updating the content thereof, and ends the present processing.

<Reflection of Inspection Effects with Inspection Processing Selection>

Figure 16:
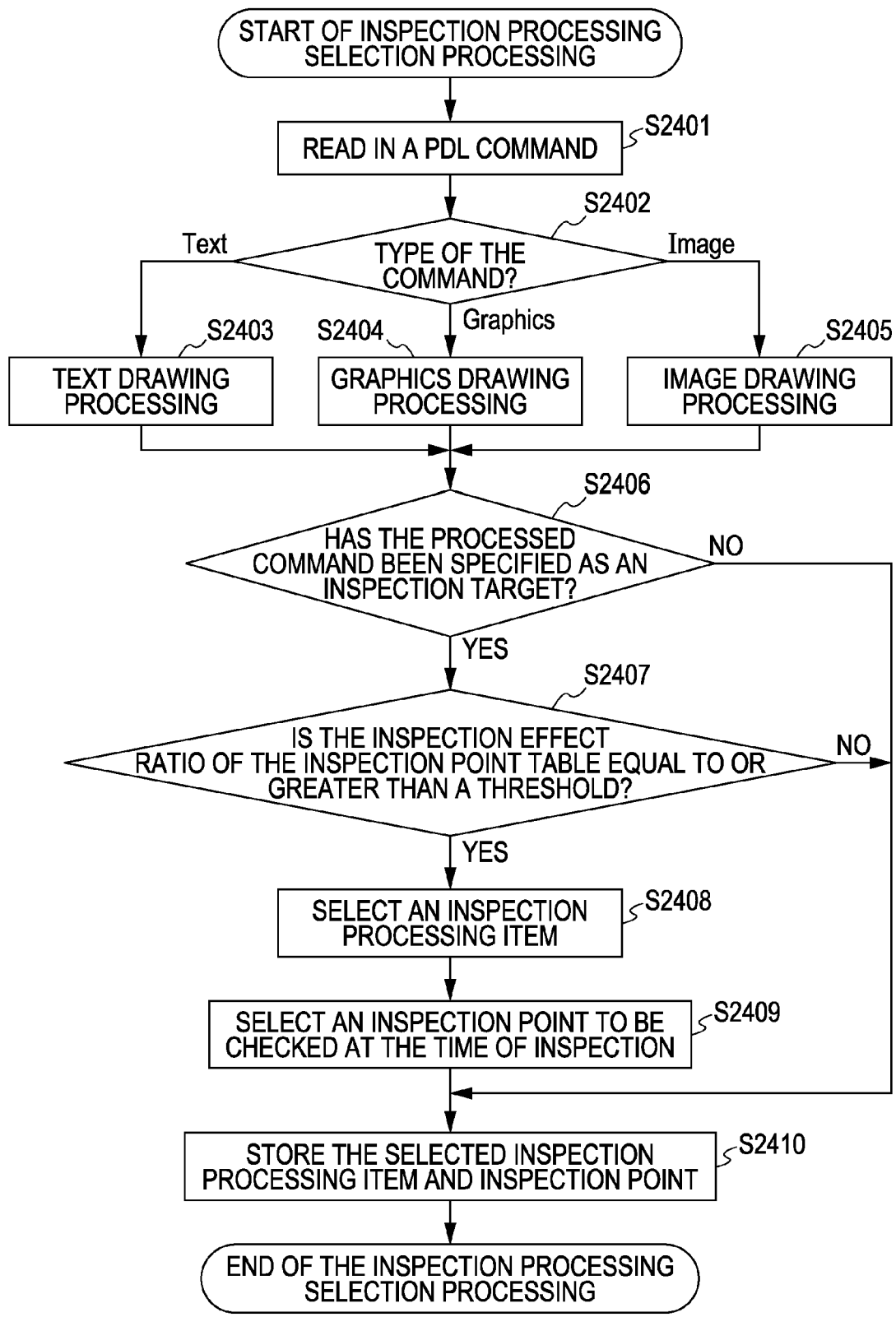
FIG. 16 is a flowchart illustrating an example of a seventh data processing procedure of an image forming apparatus according to an embodiment of the present invention.

FIG. 16 is a flowchart illustrating an example of a seventh data processing procedure of an image forming apparatus according to an embodiment of the present invention. The present example is a processing example wherein input results of implementation effects of inspection processing implemented in accordance with important inspection item selection processing shown in FIG. 13 are employed to change the implementation ratio of selection of inspection processing to be processed in a thorough manner. Note that reference symbols S2401 through S2410 denote the respective steps, which are realized by the CPU 309 loading the control program stored in the ROM 305 to the RAM 307 to execute this.

Processing for reflecting inspection effects at the time of implementing inspection processing selection processing will be described below with reference to the flowchart shown in FIG. 16.

In step S2401, the CPU 309 reads in a PDL command within input data. Subsequently, in step S2402, the CPU 309 determines the type of the PDL command currently being subjected to the analysis processing. Here, in the case of determining that the type of the PDL command is a text processing command, the CPU 309 proceeds to step S2403, and in the case of determining that the type of the PDL command is a graphics processing command, the CPU 309 proceeds to step S2404, and in the case of determining that the type of the PDL command is an image processing command, the CPU 309 proceeds to step S2405.

Subsequently, in step S2403, the CPU 309 executes processing for drawing a text in accordance with the PDL command. Such processing includes readout of font data, change in a font size, alternate font selection processing in a case where the specified font does not exist, and so forth.

Also, in step S2404, the CPU 309 executes processing for drawing a graphics in accordance with the PDL command. Such processing includes smoothing of a graphics, line generation processing, and so forth.

Further, in step S2405, the CPU 309 executes processing for drawing a bitmap image in accordance with the PDL command. Such processing includes enlargement/reduction processing of a bitmap image, decompression processing of compressed data, and so forth.

Next, in step S2406, the CPU 309 determines whether or not the command read in step S2401 and subjected to analysis processing in steps S2402 through S2405 is specified as a target to be inspected in a thorough manner. Here, in the case of determining that the command is specified as a target to be inspected in a thorough manner, the CPU 309 proceeds to step S2407, and in the case of determining that the command is not specified as a target to be inspected in a thorough manner, the CPU 309 proceeds to step S2410.

FIG. 15 illustrates an example of the inspection point table referenced in the event of determining whether or not the command is processing to be inspected in a thorough manner. Inspection information for performing inspection processing in a thorough manner, and whether there are inspection effects in the event of implementing inspection processing in accordance such inspection information are registered in such a table 2301 shown in FIG. 15.

Figure 25:
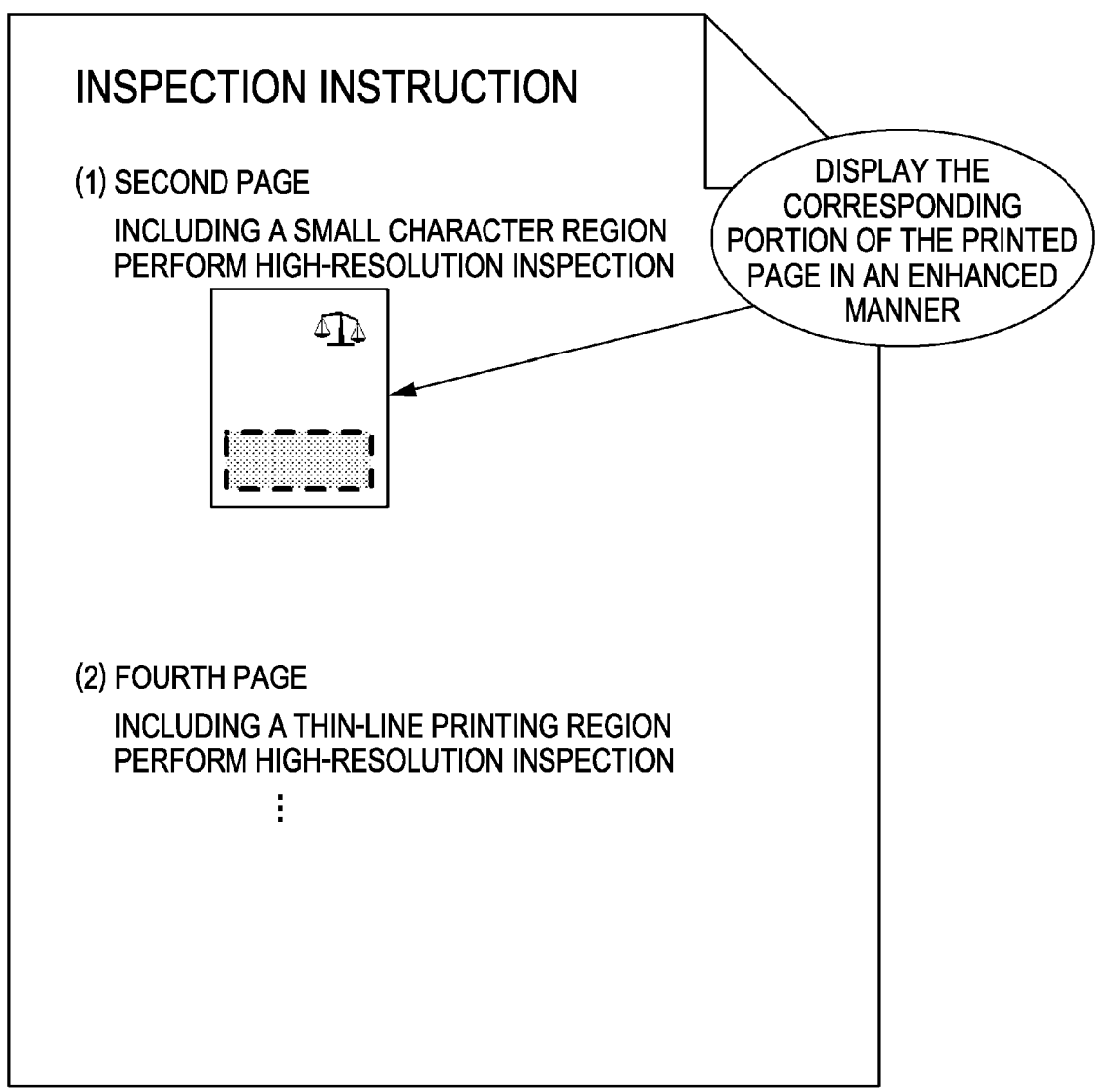
FIG. 25 is a diagram illustrating an example of an inspection instruction file which is printed by the image forming apparatus according to the present embodiment.

Next, in step S2407, in the case of determining in step S2406 that the command is processing to be inspected in a thorough manner, the CPU 309 further determines whether or not the inspection effect ratio of the inspection point table 2301 of which an example is shown in FIG. 25 is equal to or greater than a threshold. Here, in the case of determining that the inspection effect ratio is equal to or greater than a threshold, the CPU 309 proceeds to step S2408, and in the case of determining that the inspection effect ratio is less than a threshold, the CPU 309 proceeds to step S2410.

Subsequently, in step S2408, the CPU 309 selects inspection processing to be implemented in a thorough manner. Next, in step S2409, the CPU 309 selects an inspection point of interest in the event of implementing inspection processing in a thorough manner. Subsequently, in step S2410, the CPU 309 stores the inspection processing and inspection point selected in steps S2408 and S2409 respectively in the storage apparatus 1502, and ends the present processing.

The above-mentioned processing is executed, thereby enabling verification of implementation effects at the image forming apparatus of the inspection processing and inspection point selected for implementing the inspection processing in a thorough manner.

Further, efficiency and high-precision of inspection processing can be realized by reflecting inspection effect verification results input by the operator on the subsequent inspection processing selection.

Figure 17:
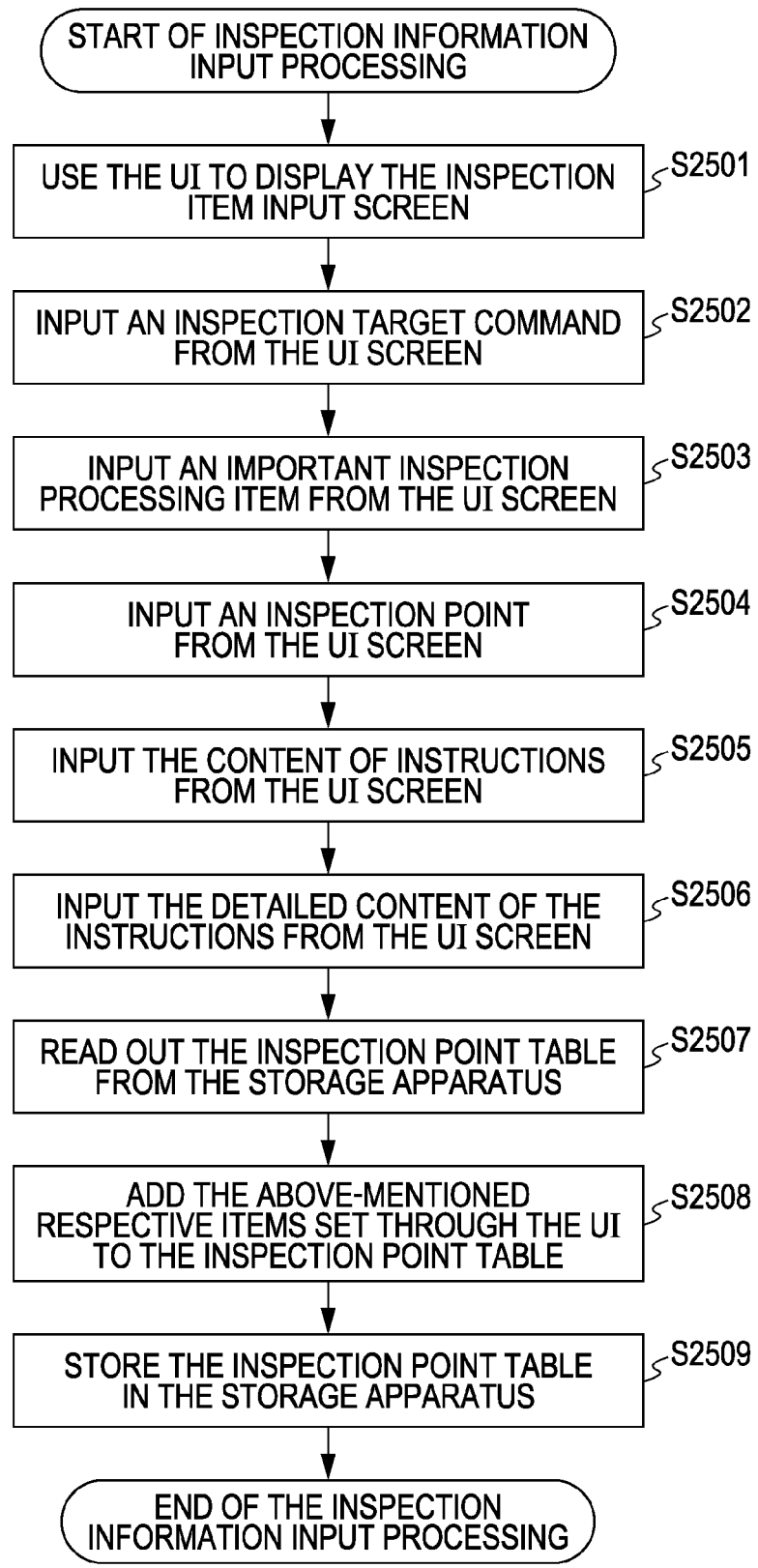
FIG. 17 is a flowchart illustrating an example of an eighth data processing procedure of an image forming apparatus according to an embodiment of the present invention.

A fourth embodiment according to the present invention will be described below with reference to the drawings. FIG. 17 is a flowchart illustrating an example of an eighth data processing procedure of an image forming apparatus according to an embodiment of the present invention. The present example is a processing example wherein the operator registers a desired item to be inspected in a thorough manner. Note that reference symbols S2501 through S2509 denote the respective steps, which are realized by the CPU 309 loading the control program stored in the ROM 305 to the RAM 307 to execute this.

Figure 18A:
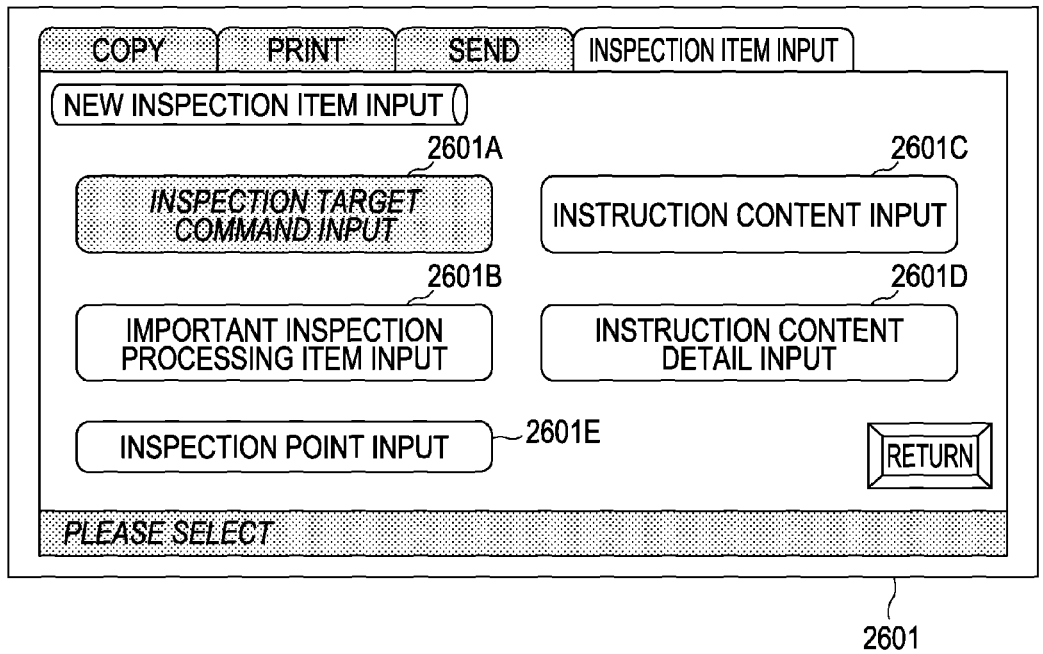
FIG. 18A is a diagram illustrating an example of a panel UI operating screen included in the image forming apparatus according to the present embodiment.
Figure 18B:
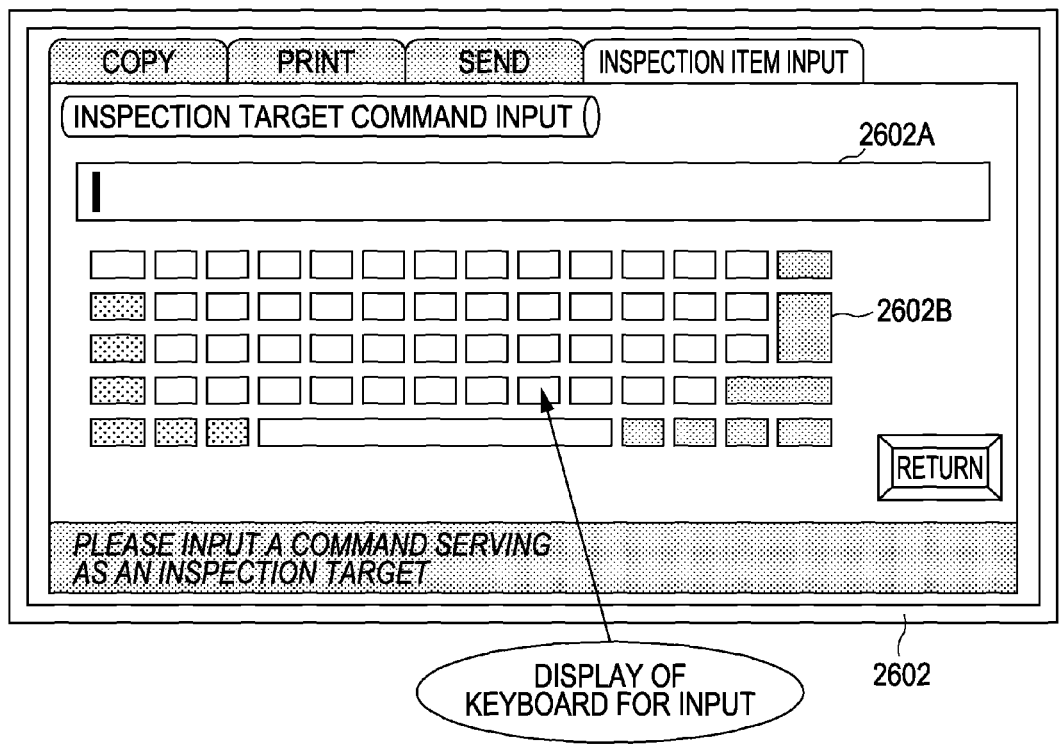
FIG. 18B is a diagram illustrating an example of the panel UI operating screen included in the image forming apparatus according to the present embodiment.

FIGS. 18A and 18B are diagrams illustrating an example of a panel UI operating screen included in the image forming apparatus according to the present embodiment. The present example is arranged wherein selecting a tab sheet enables a lower-layer menu to be opened, whereby settings relating to each tab sheet and confirmation of setting content can be performed.

FIG. 19 is a diagram illustrating an example of an inspection point table in which information relating to inspection referenced at the time of selecting inspection processing to be stored in the storage apparatus included in the image forming apparatus shown in FIG. 1 is registered.

As shown in FIG. 15, the inspection point table 2301 is an example made up of priority, processed command, important inspection processing item, inspection point, instruction content, details of instruction content, and so forth.

The present example is an example of an inspection point registration table in the case of adding an important inspection item registered by the operator.

First, in step S2501, the CPU 309 displays an inspection processing item input screen shown in FIG. 18A at the panel UI 2801 included in the image forming apparatus.

Next, in step S2502, the user presses an inspection target command input button 2601A on a panel UI 2601 shown in FIG. 18A, and the CPU 309 displays an inspection target command input screen shown in FIG. 18B as a panel UI 2602.

Subsequently, the user operates the panel UI 2602 to input an inspection target command. At this time, as shown in FIG. 18B, the CPU 309 displays a virtual keyboard 2602B, and the user inputs an inspection target command in an input portion 2602A.

Next, in step S2503, the user presses an important inspection item input button 2601B, and the CPU 309 displays an important inspection item input screen on the panel UI. Here, the user operates the panel UI 2601 shown in FIG. 18A to input an important inspection item.

Subsequently, in step S2504, the user presses an inspection point input button 2601E shown in FIG. 18A, and the CPU 309 displays an inspection point input screen on the panel UI shown in FIG. 18A. Subsequently, the user operates the panel UI shown in FIG. 18A to input an inspection point.

Next, in step S2505, the user presses an instruction content input button 2601C, and the CPU 309 displays an inspection instruction content input screen on the panel UI. Subsequently, the user operates the panel UI to input the content of inspection instructions.

Next, in step S2506, the user presses an instruction content detail input button 2601D, and the CPU 309 displays a detailed content input screen necessary for inspection processing on the panel UI shown in FIG. 18A. Subsequently, the user operates the panel UI to input the details of the content of inspection.

Next, in step S2407, the CPU 309 reads out an inspection point table 2701 shown in FIG. 19 in which various types of information relating to inspection processing are registered from the storage apparatus 1502. Subsequently, in step S2508, the CPU 309 stores the user-specified inspection information input in steps S2502 through S2506 in the respective information storage regions of the inspection point table 2701 read out in step S2507.

Subsequently, in step S2509, the CPU 309 stores, in the storage apparatus 1502, the inspection point table 2701 in which the inspection information has been registered in step S2508 based on the specifications of the user, and ends the present processing.

Thus, such as shown in the inspection point table 2701 shown in FIG. 19, the inspection point table 2701 in which the inspection information specified by the user has been registered is stored in the storage apparatus 1502. Executing the above-mentioned processing enables an important inspection item determined to be necessary by the operator to be added to the image forming apparatus.

Thus, an inspection processing item based on the experience of the operator can be added to the image forming apparatus, and accordingly, improvement of inspection work selection capability of the image forming apparatus, and high precision of inspection work can be realized.

A fifth embodiment according to the present invention will be described below with reference to the drawings.

<Important Inspection Region Selection and Inspection Processing Selection Method Employing Keyword>

FIG. 20 is a flowchart illustrating an example of a ninth data processing procedure of an image forming apparatus according to an embodiment of the present invention. The present example is an example wherein a text region matching with a keyword is subjected to inspection processing in a thorough manner. Note that reference symbols S2801 through S2813 denote the respective steps, which are realized by the CPU 309 loading the control program stored in the ROM 305 to the RAM 307 to execute this.

FIG. 21 is a diagram illustrating an example of an inspection instruction file which is printed by the image forming apparatus according to the present embodiment. The present example is an example in a case where a text region matched with a keyword is extracted and displayed in an enhanced manner.

In step S2801, the CPU 309 reads in a PDL command within input data held in the reception buffer of the RAM 307.

Next, in step S2802, the CPU 309 determines what the type of a PDL command currently being subjected to the analysis processing is. Here, in the case of determining that the PDL command is a text processing command, the CPU 309 proceeds to step S2803. Similarly, in the case of determining that the PDL command is a graphics processing command, the CPU 309 proceeds to step S2804. Further, in the case of determining that the PDL command is an image processing command, the CPU 309 proceeds to step S2805.

Subsequently, in step S2803, the CPU 309 executes processing for drawing a text in accordance with the PDL command. Such processing includes readout of font data, change in a font size, alternate font selection processing in a case where a specified font does not exist, or the like.

Next, in step S2804, the CPU 309 executes processing for drawing a graphics in accordance with the PDL command. Such processing includes smoothing of a graphics, line generation processing, or the like.

Subsequently, in step S2805, the CPU 309 executes processing for drawing a bitmap image. Such processing includes enlargement/reduction processing of a bitmap image, decompression processing of compressed data, or the like.

Next, after the processing for all of the PDL data included in the page is completed, in step S2806 the CPU 309 implements rendering processing to generate a bitmap image and image-area image.

Next, in step S2807, the CPU 309 extracts a text region from an image-area image, and subjects this to OCR processing to extract a text string. Subsequently, in step S2808, the CPU 309 reads out a list of keyword text strings stored in the storage apparatus 1502 on which the user desires to implement inspection processing in a thorough manner.

Next, in step S2809, the CPU 309 determines whether or not the text string extracted in step S2807 is included in the keywords read out from the storage apparatus in step S2808.

Here, in the case of determining that there is no matched keyword, the CPU 309 ends the present processing.

On the other hand, in the case of determining in step S2809 that there is a matched keyword, in step S2810 the CPU 309 extracts the text region extracted in step S2807, and paragraph information from the OCR results.

Next, in order to subject text information included in the paragraph information extracted in step S2810 to inspection processing, in step S2811 the CPU 309 references the inspection point table to select inspection processing to be implemented in a thorough manner.

Next, in step S2812, the CPU 309 selects an inspection point of interest at the time of implementing inspection processing in a thorough manner. Next, in step S2813, the CPU 309 stores the inspection processing and inspection point selected in steps S2811 and S2812 in the storage apparatus 1502, and ends the present processing.

<Inspection Processing Selection Method According to Important inspection Region Specification>

Figure 22:
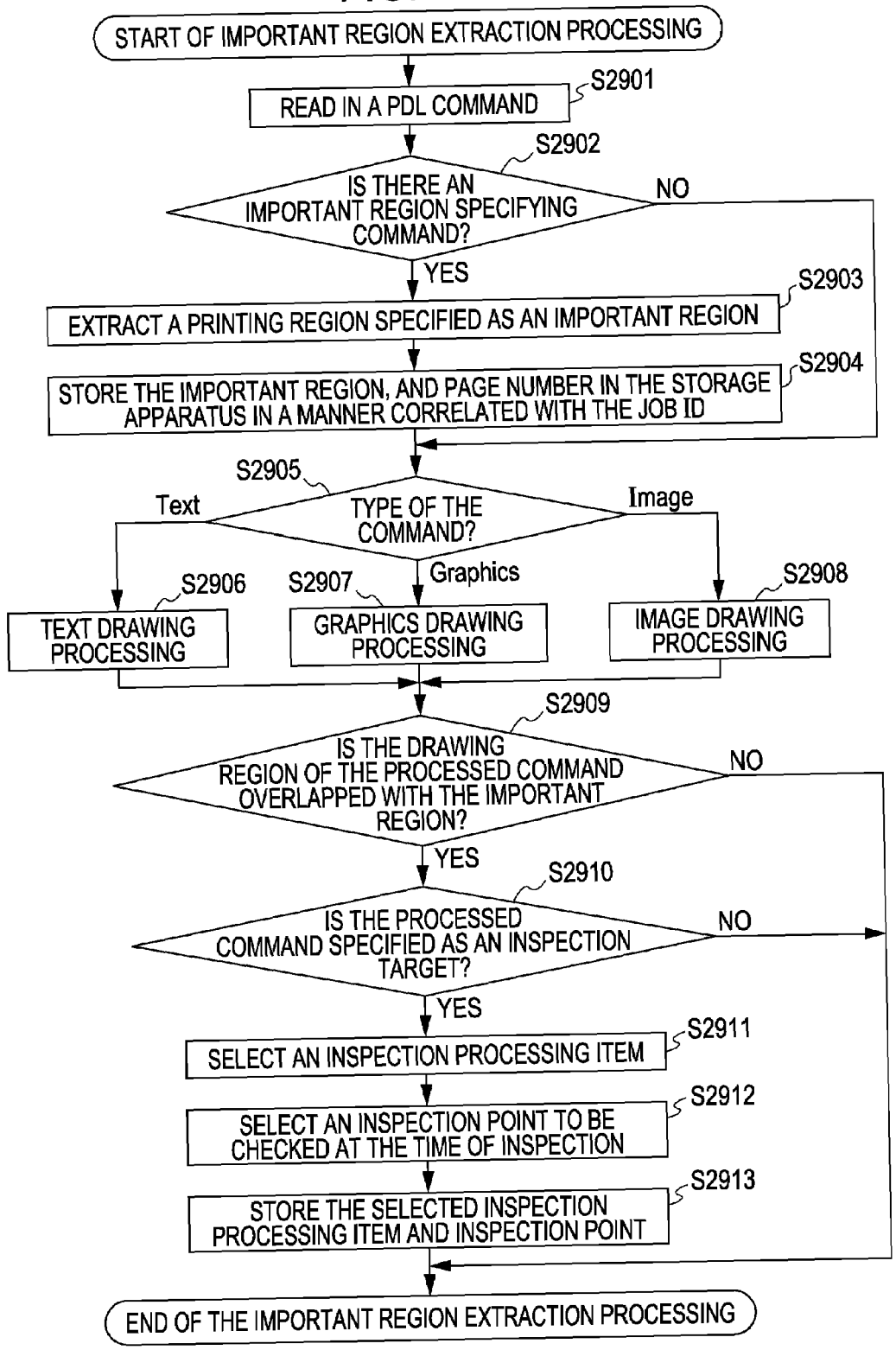
FIG. 22 is a flowchart illustrating an example of a tenth data processing procedure of an image forming apparatus according to an embodiment of the present invention.

FIG. 22 is a flowchart illustrating an example of a tenth data processing procedure of an image forming apparatus according to an embodiment of the present invention. The present example is an example wherein in a case in which a command for specifying a region to be subjected to inspection processing in a thorough manner is included in input data, data matched with a specified important region is subjected to inspection processing in a thorough manner. Note that reference symbols S2901 through S2913 denote the respective steps, which are realized by the CPU 309 loading the control program stored in the ROM 305 to the RAM 307 to execute this.

In step S2901, the CPU 309 reads in a PDL command within input data held in the reception buffer of the RAM 307.

Next, in step S2902, the CPU 309 determines whether or not a command for specifying an important region is included in the input data. Here, in the case of determining that a command for specifying an important region is included in the input data, the CPU 309 proceeds to step S2903, and in the case of determining that a command for specifying an important region is not included in the input data, the CPU 309 proceeds to step S2905.

Subsequently, in the case of determining in step S2902 that a command for specifying an important region is included in the input data, in step S2903 the CPU 309 interprets the important region specifying command to determine an important region.

Next, in step S2904, the CPU 309 stores the important region determined in step S2903, and the page number currently being subjected to the processing in the storage apparatus 1502 in a correlated manner with the job ID.

Subsequently, in step S2905, the CPU 309 determines which of a text processing command, graphics processing command, and image processing command the type of the PDL command currently being subjected to the analysis processing is. Here, in the case of determining that the type of the PDL command is a text processing command, the CPU 309 proceeds to step S2906.

Also, in the case of determining that the type of the PDL command is a graphics processing command, the CPU 309 proceeds to step S2907.

Also, in the case of determining that the type of the PDL command is an image processing command, the CPU 309 proceeds to step S2908.

Subsequently, in step S2906, the CPU 309 executes processing for drawing a text in accordance with the PDL command. Such processing includes readout of font data, change in a font size, alternate font selection processing in a case where a specified font does not exist, or the like.

Also, in step S2907, the CPU 309 executes processing for drawing a graphics in accordance with the PDL command. Such processing includes smoothing of a graphics, line generation processing, or the like.

Further, in step S2908, the CPU 309 executes processing for drawing a bitmap image. Such processing includes enlargement/reduction processing of a bitmap image, decompression processing of compressed data, or the like.

Next, in step S2909, the CPU 309 determines whether or not the drawing region of the PDL command during the processing is overlapped with the important region determined in step S2903. Here, in the case of determining that the drawing region is overlapped with the important region, the CPU 309 proceeds to step S2910, and in the case of determining that the drawing region is not overlapped with the important region, the CPU 309 ends the present processing.

Next, in step S2910, the CPU 309 determines whether or not the command read in step S2901 and subjected to analysis processing in steps S2905 through S2908 is specified as a target to be inspected in a thorough manner. Here, in the case of determining that the command is specified as a target to be inspected in a thorough manner, the CPU 309 proceeds to step S2911, and in the case of determining that the command is not specified as a target to be inspected in a thorough manner, the CPU 309 ends the present processing.

Subsequently, in step S2911, the CPU 309 references the inspection point table to select inspection processing to be implemented in a thorough manner.

Next, in step S2912, the CPU 309 selects an inspection point of interest at the time of implementing inspection processing in a thorough manner.

Subsequently, in step S2913, the CPU 309 stores the inspection processing and inspection point selected in steps S2911 and S2912 in the storage apparatus 1502, and ends the present processing.

<Generation of Thumbnail Image for Important Inspection Region, and Inspection Instruction File Printing Method>

Figure 23:
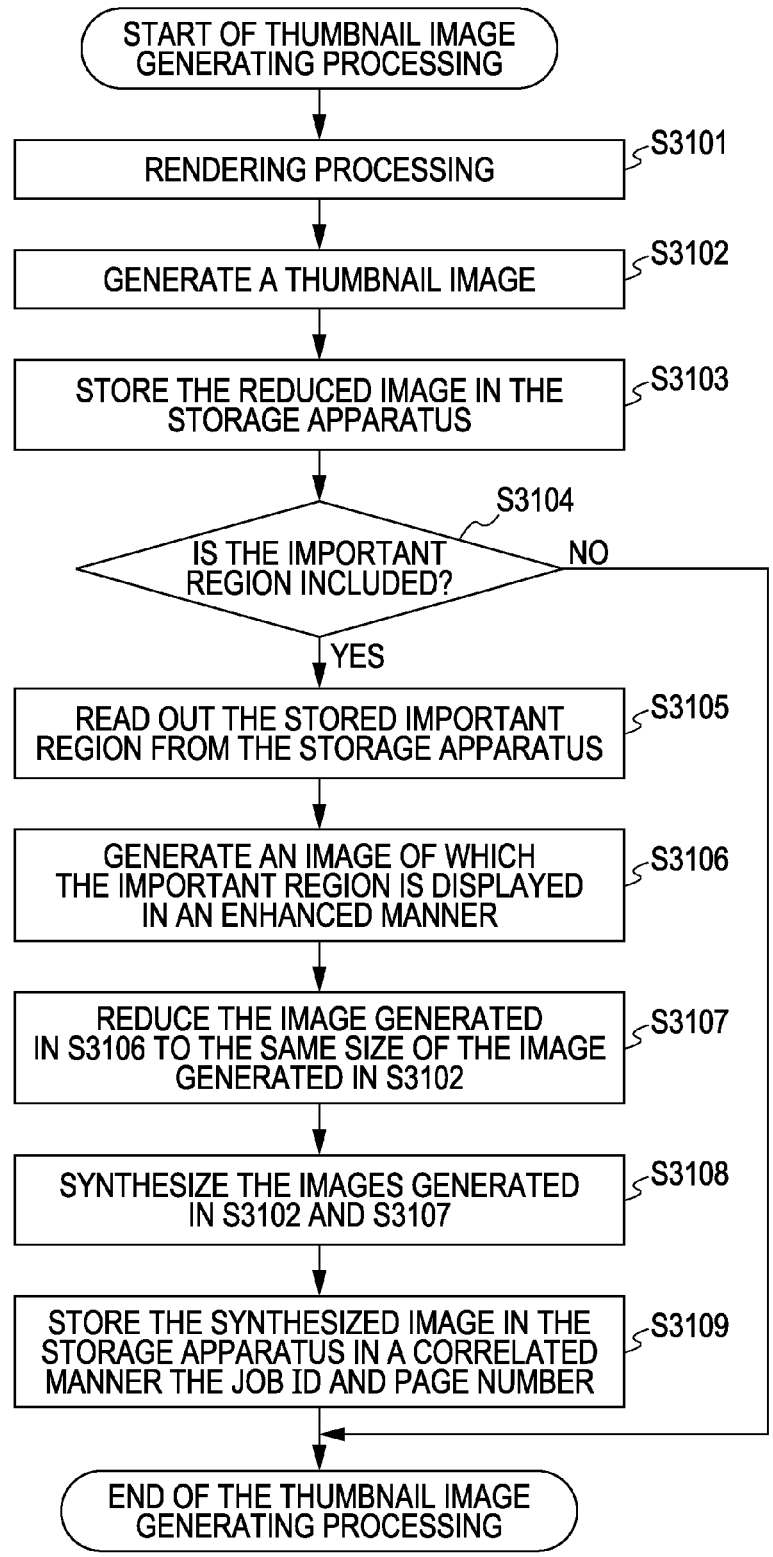
FIG. 23 is a flowchart illustrating an example of an eleventh data processing procedure of an image forming apparatus according to an embodiment of the present invention.

FIG. 23 is a flowchart illustrating an example of an eleventh data processing procedure of an image forming apparatus according to an embodiment of the present invention. The present example is a processing example wherein a rendering image and a region to be subjected to inspection processing in a thorough manner are generated as a thumbnail image. Note that reference symbols S3101 through S3109 denote the respective steps, which are realized by the CPU 309 loading the control program stored in the ROM 305 to the RAM 307 to execute this.

In step S3101, the CPU 309 interprets all of the PDL data included in a page held in the reception buffer of the RAM 307, and then subjects this page to rendering processing to generate a bitmap image.

Subsequently, in step S3102, the CPU 309 reduces a display size of the bitmap image generated in step S3101 to generate a thumbnail image.

Next, in step S3103, the CPU 309 stores the thumbnail image generated in step S3102 in the storage apparatus 1502 in a correlated manner with the job ID and document page number.

Subsequently, in step S3104, the CPU 309 determines whether or not the page subjected to rendering processing includes the important region. Note that the important region has been determined with the processing flow shown in FIG. 22.

Here, in the case of determining that the important region is included, the CPU 309 proceeds to step S3105, and in the case of determining that the important region is not included, the CPU 309 ends the present processing.

Subsequently, in step S3105, the CPU 309 reads out the important region stored in the storage apparatus 1502 in step S3103. Next, in step S3106, the CPU 309 generates an image wherein the important region is displayed in an enhanced manner. With the present embodiment, such as shown in FIG. 21, there can be conceived surrounding the important region with a line, displaying the important region with a colored background, or the like.

Next, in step S3107, the CPU 309 reduces the image generated in step S3106 wherein the important region is displayed in an enhanced manner to the same size as the size of the thumbnail image reduced in step S3102.

Next, in step S3108, the CPU 309 subjects the images generated in steps S3102 and S3107 to synthesis processing. Subsequently, in step S3109, the CPU 309 stores the image subjected to the synthesis processing in step S3108 in the storage apparatus 1502 in a correlated manner with the job ID and page number, and ends the present processing.

Figure 24:
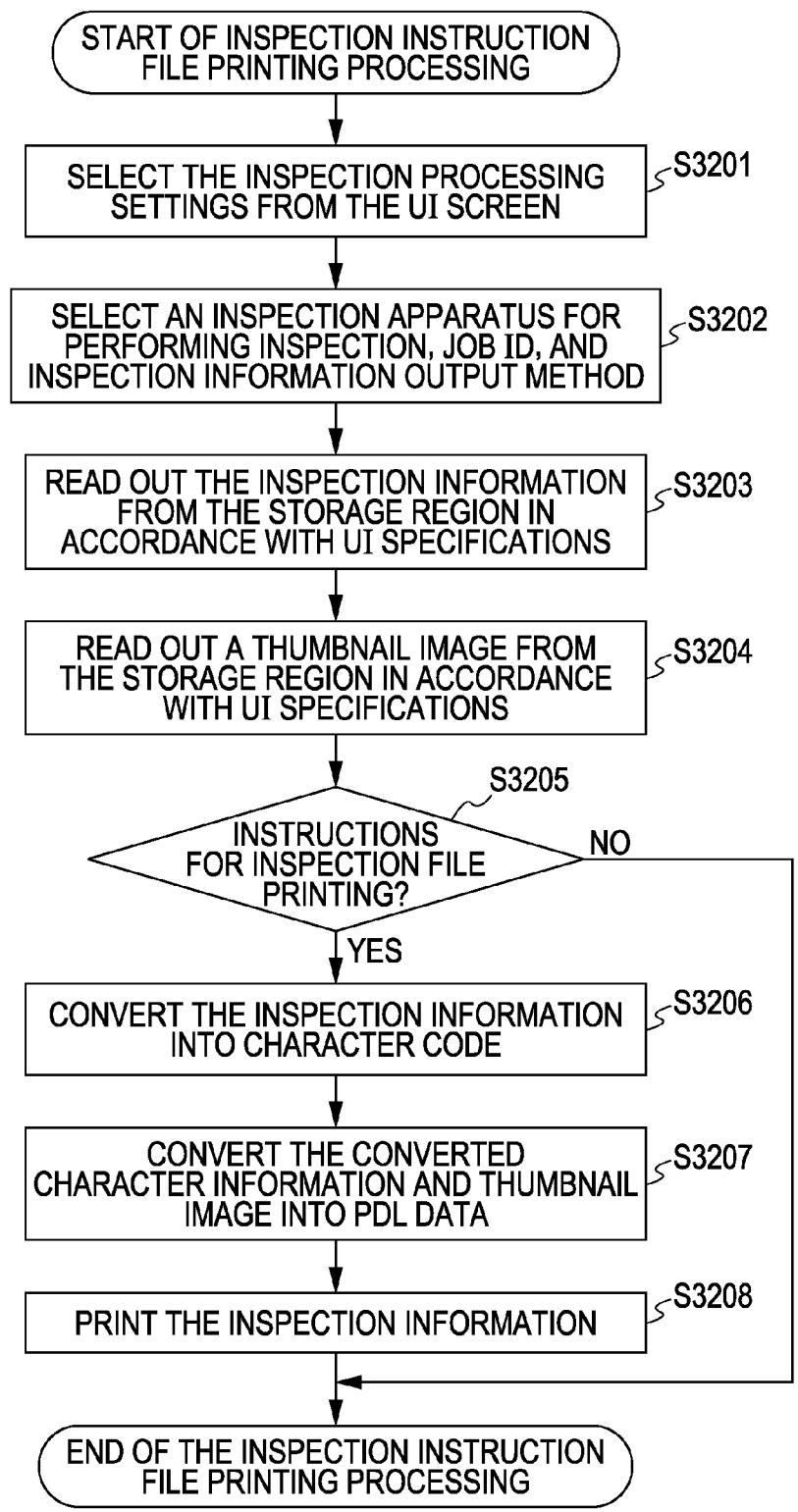
FIG. 24 is a flowchart illustrating an example of a twelfth data processing procedure of an image forming apparatus according to an embodiment of the present invention.

Description will be made below regarding a method for printing a thumbnail image generated in accordance with the flowchart shown in FIG. 23 on an inspection instruction, with reference to FIG. 24. FIG. 24 is a flowchart illustrating an example of a twelfth data processing procedure of an image forming apparatus according to an embodiment of the present invention. The present example is a processing example wherein a thumbnail image is printed on an inspection instruction. Note that reference symbols S3201 through S3208 denote the respective steps, which are realized by the CPU 309 loading the control program stored in the ROM 305 to the RAM 307 to execute this.

In step S3201, the user employs the panel UI included in the image forming apparatus 100 to press the inspection processing setting button 1701A displayed on the panel UI 1701 shown in FIG. 10A.

Subsequently, in step S3202, the user presses buttons 1702A, 1702B, and 1702C displayed on the panel UI 1702 shown in FIG. 10B to select an inspection apparatus for performing inspection, job ID, and inspection information output method, respectively.

Note that an example of panel UI display for selecting an inspection apparatus at this time will be shown in the panel UI 1702 in FIG. 10B, an example of panel UI display for selecting a job ID at this time will be shown in the panel UI 1703 in FIG. 10C, and an example of panel UI display for selecting an inspection information output method at this time will be shown in the panel UI 1704 in FIG. 10D.

Next, in step S3203, the CPU 309 reads out inspection information corresponding to the job ID selected in accordance with the UI specification in step S3202 from the storage region.

Subsequently, in step S3204, the CPU 309 reads out a thumbnail image corresponding to the job ID selected in accordance with the UI specification in step S3202 from the storage apparatus 1502.

Next, in step S3205, the CPU 309 determines whether or not the inspection information output method selected in step S3202 is inspection instruction file printing instructions. Here, in the case of determining that the inspection information output method is instructions for printing an inspection instruction file, the CPU 309 proceeds to step S3206, and in the case of determining that the inspection information output method is not instructions for printing an inspection instruction file, the CPU 309 ends the present processing.

Next, in step S3206, the CPU 309 converts the inspection information read out in step S3203 into character code which the PDL can interpret, e.g., JIS code or the like. Note that character code is not restricted to JIS code.

Next, in step S3207, the CPU 309 converts the character information converted into character code which the PDL can interpret in step S3207, and the thumbnail image read out in step S3204, into PDL data.

Subsequently, in step S3208, the CPU 309 transmits the inspection information converted into PDL data to the PDL analyzing unit of the image forming apparatus in step S3207, executes printing processing, and ends the present processing.

Thus, an inspection instruction file 3301 shown in FIG. 25 is output from the printer engine. FIG. 25 is a diagram illustrating an example of an inspection instruction file which is printed by the image forming apparatus according to the present embodiment.

Executing the above-mentioned processing enables specifying of a text region including a keyword registered beforehand, or a region to be subjected to inspection processing in a thorough manner, whereby a region to be inspected in a thorough manner can be restricted. That is to say, high precision can be realized without increasing load applied to inspection processing of an inspection apparatus.

Figure 26:
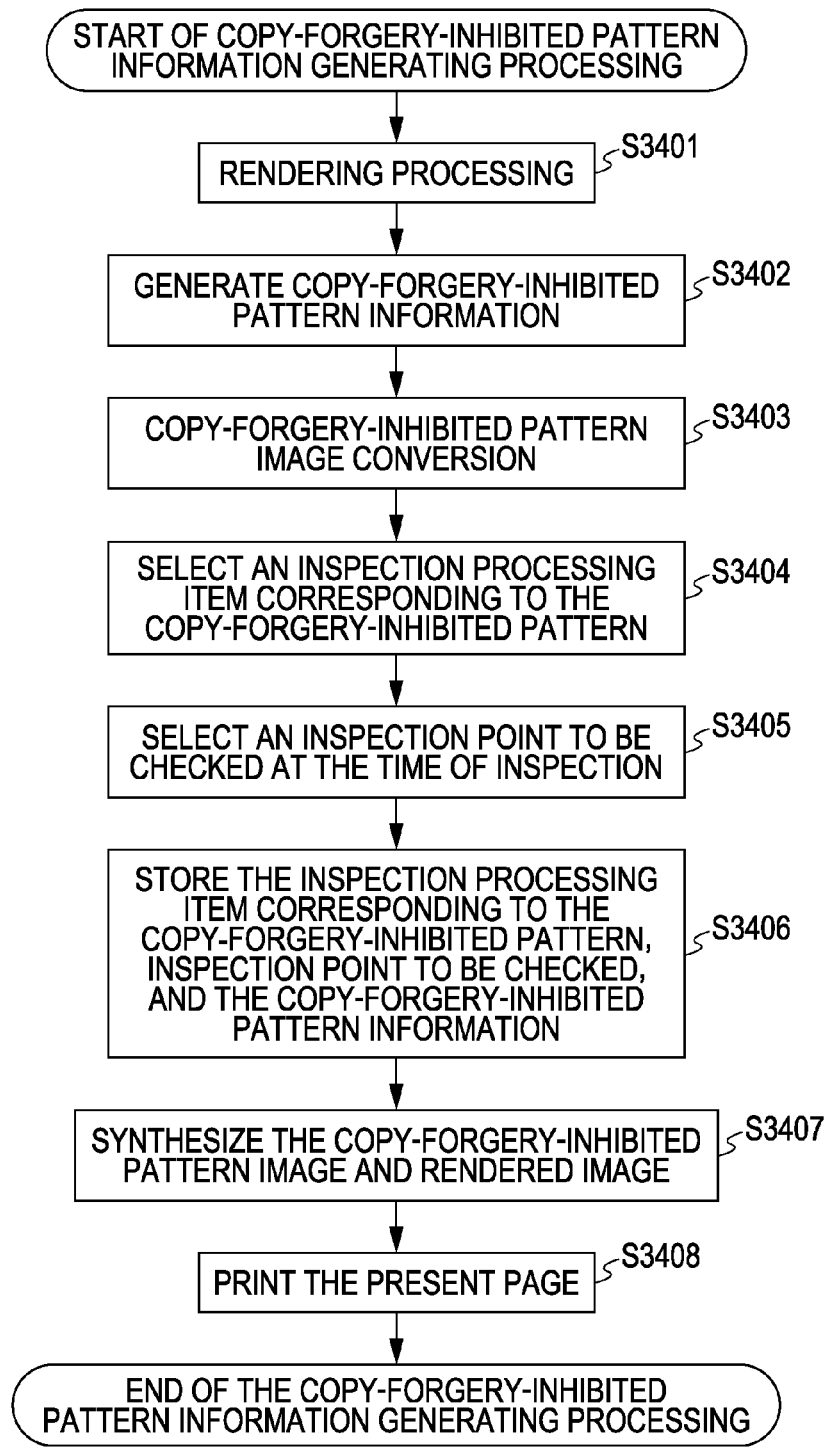
FIG. 26 is a flowchart illustrating an example of a thirteenth data processing procedure of an image forming apparatus according to an embodiment of the present invention.

A sixth embodiment according to the present invention will be described below with reference to the drawings. FIG. 26 is a flowchart illustrating an example of a thirteenth data processing procedure of an image forming apparatus according to an embodiment of the present invention. The present example is an example wherein a copy-forgery-inhibited pattern image including particular information is generated, and an inspection processing selection unit subjects the copy-forgery-inhibited pattern information to inspection processing. Note that reference symbols S3401 through S3408 denote the respective steps, which are realized by the CPU 309 loading the control program stored in the ROM 305 to the RAM 307 to execute this.

<Inspection Processing Implementation Method as to Copy-Forgery-Inhibited Pattern Information>

In step S3401, the CPU 309 interprets all of the PDL data included in the page, and then implements rendering processing thereupon. Next, after the rendering processing, in step S3402 the CPU 309 collects information to be embedded in an image as copy-forgery-inhibited pattern information to generate this as copy-forgery-inhibited pattern information.

FIG. 27 is a diagram describing copy-forgery-inhibited pattern information, and an output form thereof, with the image forming apparatus according to the present embodiment. (A) in FIG. 27 illustrates a data structure 3601 of copy-forgery-inhibited pattern information, and (B) in FIG. 27 illustrates an inspection instruction file 3602 to be printed with the image forming apparatus according to the present embodiment. (A) in FIG. 27 illustrates an example wherein a printing processing implementation date, document name, name of user who implemented printing, and number of copies are included as copy-forgery-inhibited pattern information, but in addition to these, the number of total printed sheets, and information relating to an apparatus which executes printing may be included.

Next, in step S3403, the CPU 309 converts the copy-forgery-inhibited pattern information generated in step S3402 into a copy-forgery-inhibited pattern image. Subsequently, in step S3404, the CPU 309 selects inspection processing as to the copy-forgery-inhibited pattern image. For example, there can be conceived selecting instructions for inspecting whether or not reproduced information obtained by reading out copy-forgery-inhibited pattern information from a copy-forgery-inhibited pattern image and reproducing this is identical to information embedded in the copy-forgery-inhibited pattern image at the image forming apparatus, or the like.

Next, in step S3405, the CPU 309 selects an inspection point to be checked in a thorough manner at the time of inspection. With the present embodiment, there can be conceived confirming whether or not copy-forgery-inhibited pattern information read out from an inspection target is identical to input copy-forgery-inhibited pattern information, or the like.

Next, in step S3406, the CPU 309 stores information as to inspection processing to be implemented in a thorough manner selected in steps S3404 and S3405 (inspection point, copy-forgery-inhibited pattern information) in the storage apparatus 1502.

Subsequently, in step S3407, the CPU 309 synthesizes the bitmap image generated in step S3401 and subjected to rendering, and the copy-forgery-inhibited pattern image generated in step S3403.

Next, in step S3408, the CPU 309 outputs the image synthesized in step S3407 to the printer engine, thereby executing printing processing of the page, and ends the present processing.

<Example of Copy-Forgery-Inhibited Pattern Information Verification Processing>

Figure 28:
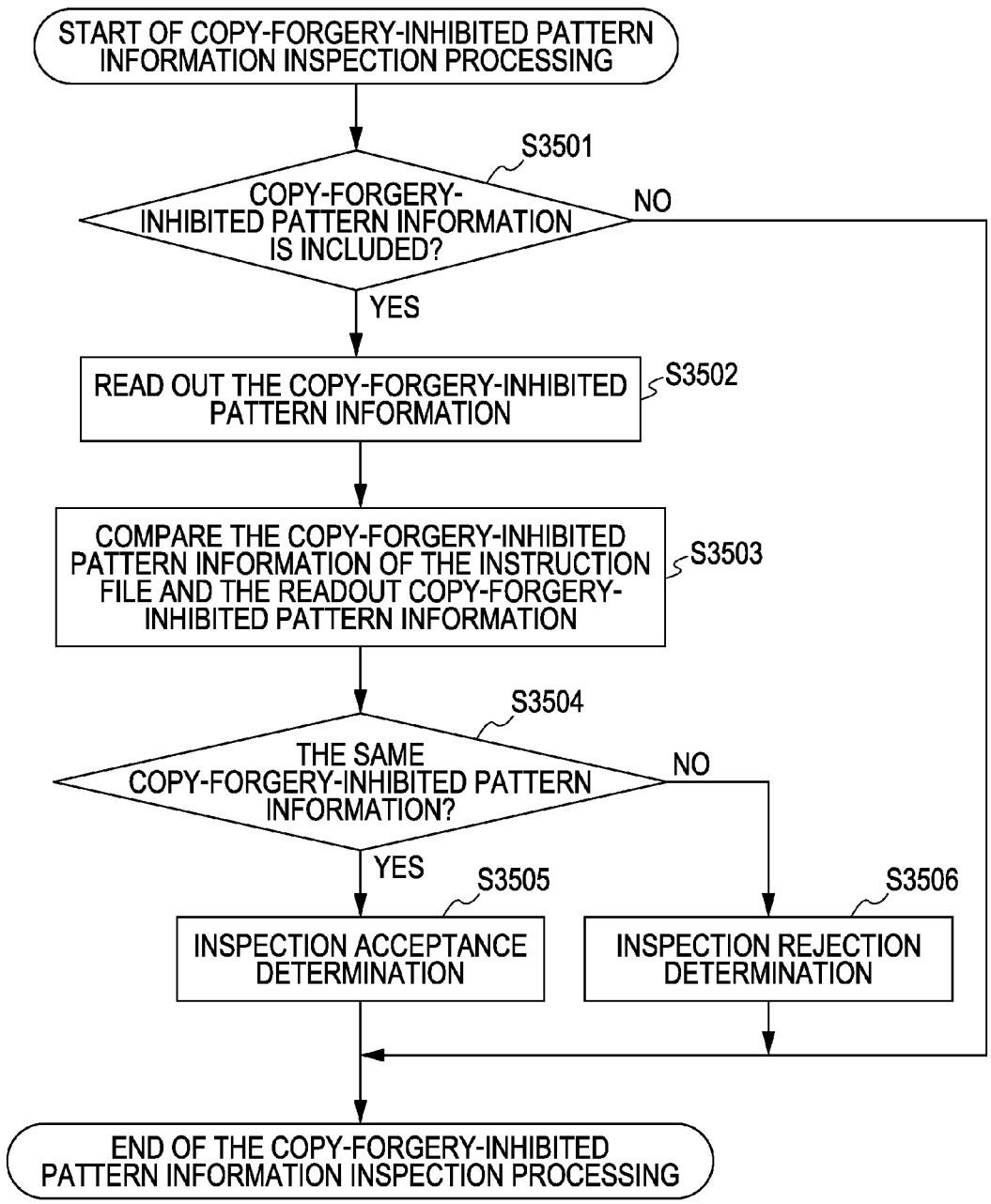
FIG. 28 is a flowchart illustrating an example of a fourteenth data processing procedure of an image forming apparatus according to an embodiment of the present invention.

FIG. 28 is a flowchart illustrating an example of a fourteenth data processing procedure of an image forming apparatus according to an embodiment of the present invention. The present example is an inspection processing example as to copy-forgery-inhibited pattern information. Note that reference symbols S3501 through S3506 denote the respective steps, which are realized by the CPU 309 loading the control program stored in the ROM 305 to the RAM 307 to execute this.

In step S3501, the CPU 309 determines whether or not an inspection target includes copy-forgery-inhibited pattern information. Here, in the case of determining that copy-forgery-inhibited pattern information is included, the CPU 309 proceeds to step S3502, and in the case of determining that copy-forgery-inhibited pattern information is not included, the CPU 309 ends the present processing.

Subsequently, in step S3502, the CPU 309 reads out copy-forgery-inhibited pattern information included in a copy-forgery-inhibited pattern image. Subsequently, in step S3503, the CPU 309 compares copy-forgery-inhibited pattern information included in the inspection instruction file, and the copy-forgery-inhibited pattern information read out the copy-forgery-inhibited pattern image in step S3502.

Subsequently, in step S3504, the CPU 309 determines whether or not both of the copy-forgery-inhibited pattern information compared in step S3503 are matched. Here, in the case of determining that both of the copy-forgery-inhibited pattern information compared in step S3503 are matched, the CPU 309 proceeds to step S3505, and in the case of determining that both of the copy-forgery-inhibited pattern information compared in step S3503 are unmatched, the CPU 309 proceeds to step S3506.

Subsequently, in step S3505, the CPU 309 determines the inspection processing results to be "passed", and ends the present processing.

On the other hand, in step S3506, the CPU 309 determines the inspection processing results to be "rejected", and ends the present processing.

Executing the above-mentioned processing enables selecting inspection processing, and instructing this to an inspection apparatus having a function for reading out copy-forgery-inhibited pattern information included in a copy-forgery-inhibited pattern image, and confirming consistency.

Figure 29:
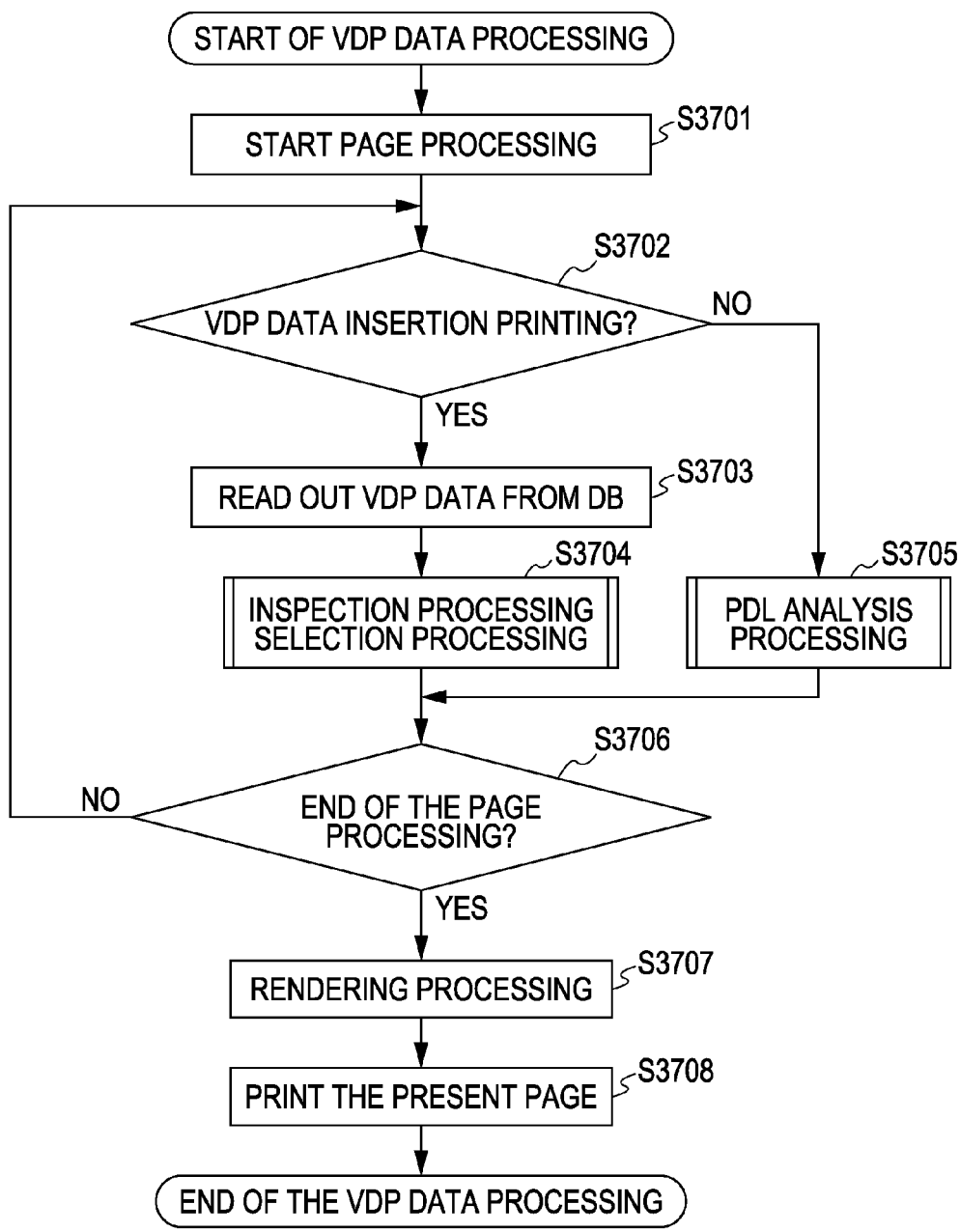
FIG. 29 is a flowchart illustrating an example of a fifteenth data processing procedure of an image forming apparatus according to an embodiment of the present invention.

A seventh embodiment according to the present invention will be described below with reference to the drawings. FIG. 29 is a flowchart illustrating an example of a fifteenth data processing procedure of an image forming apparatus according to an embodiment of the present invention. The present example is an inspection processing example wherein only a variable data region is inspected in a thorough manner with an image forming apparatus capable of variable data printing (hereafter, referred to as VDP). Note that reference symbols S3701 through S3708 denote the respective steps, which are realized by the CPU 309 loading the control program stored in the ROM 305 to the RAM 307 to execute this.

<VDP Data Processing Method>

First, in step S3701, upon the user inputting data to the image forming apparatus 100, the CPU 309 starts page processing.

Next, in step S3702, the CPU 309 determines whether or not the input data includes a VDP data insertion printing command. Here, in the case of determining that a VDP data insertion printing command is included, the CPU 309 proceeds to step S3703, and in the case of determining that a VDP data insertion printing command is not included, the CPU 309 proceeds to step S3705.

Subsequently, in step S3703, the CPU 309 performs processing for reading out VDP data from the DB specified in accordance with VDP data information included in the VDP data insertion printing command.

Next, in step S3704, the CPU 309 subjects the VDP data read out in step S3703 to inspection processing selection processing. Note that the steps of the inspection processing selection processing are the same as those in the processing flow described with reference to FIG. 5 with the first embodiment, so redundant description will be omitted.

Next, in step S3705, the CPU 309 executes normal PDL analysis processing wherein inspection processing selection is not implemented, and proceeds to step S3706. Note that the PDL analysis processing corresponding to step S3705 will be described in later-described FIG. 30.

Next, in step S3706, the CPU 309 determines whether or not the page processing is completed. Here, in the case of determining that the processing for all of the commands included in the page has been completed, the CPU 309 proceeds to step S3707, and in the case of determining that the processing for all of the commands included in the page has not been completed, the CPU 309 proceeds to step S3702, and repeats the processing in steps S3702 through S3706 until the processing for all of the commands included in the page.

Subsequently, in step S3707, the CPU 309 implements rendering processing to generate a bitmap image to be printed.

Subsequently, after the rendering processing is completed, in step S3708 the CPU 309 outputs the bitmap image generated in step S3706 to the printer engine, thereby executing printing processing of the page, and ends the present processing.

<PDL Analysis Processing>

Figure 30:
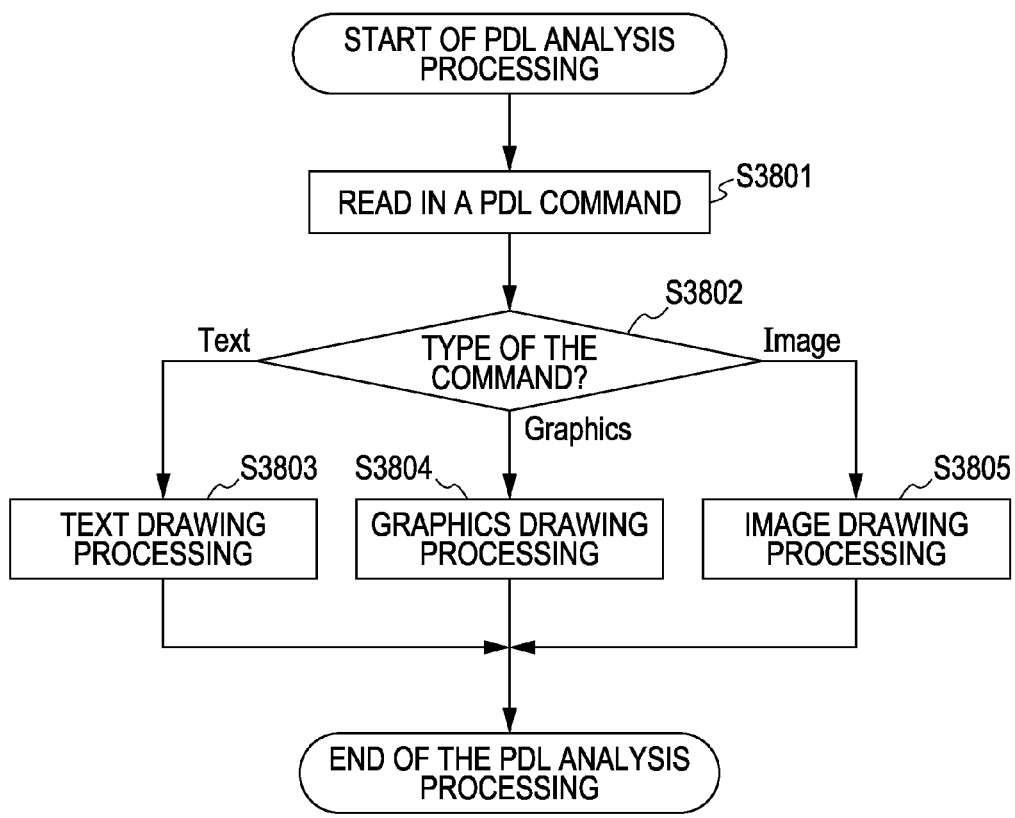
FIG. 30 is a flowchart illustrating an example of a sixteenth data processing procedure of an image forming apparatus according to an embodiment of the present invention.

FIG. 30 is a flowchart illustrating an example of a sixteenth data processing procedure of an image forming apparatus according to an embodiment of the present invention. The present example is a detailed example of the PDL analysis processing in step S3705 shown in FIG. 29. Note that reference symbols S3801 through S3805 denote the respective steps, which are realized by the CPU 309 loading the control program stored in the ROM 305 to the RAM 307 to execute this.

In step S3801, the CPU 309 reads in a PDL command within the input data held in the reception buffer of the RAM 307.

Next, in step S3802, determination is made regarding whether the type of the PDL command currently being subjected to the analysis processing is a text processing command, graphics processing command, or image processing command. Here, in the case of determining that the type of the PDL command is a text processing command, the CPU 309 proceeds to step S3803.

Also, in the case of determining that the type of the PDL command is a graphics processing command, the CPU 309 proceeds to step S3804.

Also, in the case of determining that the type of the PDL command is an image processing command, the CPU 309 proceeds to step S3805.

Subsequently, in step S3803, the CPU 309 executes processing for drawing a text in accordance with the PDL command. Such processing includes readout of font data, change in a font size, alternate font selection processing in a case where a specified font does not exist, or the like.

Also, in step S3804, the CPU 309 executes processing for drawing a graphics in accordance with the PDL command. Such processing includes smoothing of a graphics, line generation processing, or the like.

Also, in step S3805, the CPU 309 executes processing for drawing a bitmap image. Such processing includes enlargement/reduction processing of a bitmap image, decompression processing of compressed data, or the like.

Executing the above-mentioned processing enables a range to be inspected in a thorough manner to be restricted to variable data, i.e., the selected inspection processing can be implemented without increasing load applied to inspection processing of an inspection apparatus.

The essence and scope of the present invention are not restricted to particular descriptions or drawings regarding the present invention, and extend to various modifications or alternations of the content described in the Claims. Further, the present invention may be carried out as, for example, a system, apparatus, method, program, recording medium, or the like. Specifically, the present invention may be applied to a system configured of multiple apparatuses, or may be applied to equipment made up of a single apparatus.

A modification of the data processing according to the above-mentioned embodiment will be described next. FIG. 31 is a flowchart illustrating an example of a seventeenth data processing procedure of an image forming apparatus according to an embodiment of the present invention. The present example is a modification of the processing shown in FIG. 4. Note that reference symbols S4101 through S4120 denote the respective steps, which are realized by the CPU 309 loading the control program stored in the ROM 305 to the RAM 307 to execute this.

First, in step S4101, the user inputs data to the image forming apparatus 100 through an external connection apparatus such as a host computer or the like connected through the network interface 113 or 114 or external apparatus connection interface 312.

Subsequently, in the step S4102, the CPU 309 initializes inspection information (Check_Info) managed on the RAM 307.

Next, upon the data being input, in step S4103 the CPU 309 of the image forming apparatus 100 starts job processing.

Next, in step S4104 the CPU 309 starts processing of PDL data included within the page, and in step S4105 the CPU 309 divides the PDL data into commands.

Subsequently, in step S4106, the CPU 309 determines the type of the PDL command currently being subjected to the analysis processing to select processing in accordance with the command. Here, in the case of determining that the command is a text processing command, the CPU 309 proceeds to step S4107.

Also, in the case of determining that the command is a graphics processing command, the CPU 309 proceeds to step S4108. Also, in the case of determining that the command is an image processing command, the CPU 309 proceeds to step S4109.

Subsequently, in step S4107, the CPU 309 executes processing for drawing a text in accordance with the PDL command. Such processing includes readout of font data, change in a font size, alternate font selection processing in a case where a specified font does not exist, or the like.

Also, in step S4108, the CPU 309 executes processing for drawing a graphics in accordance with the PDL command. Such processing includes smoothing of a graphics, line generation processing, or the like.

Also, in step S4109, the CPU 309 executes processing for drawing a bitmap image. Such processing includes enlargement/reduction processing of a bitmap image, decompression processing of compressed data, or the like.

Next, in step S4110, the CPU 309 selects an important inspection item and inspection item from an inspection target table shown in FIG. 32. Next, in step S4111, the CPU 309 adds the selected important inspection item and inspection item to the inspection information (Check_Info).

Subsequently, in step S4112, the CPU 309 determines whether or not the analysis processing for all of the PDL commands included in the page has been completed. Here, in the case of determining that the analysis processing for all of the PDL commands included in the page has been completed, the CPU 309 proceeds to step S4113, and the analysis processing for all of the PDL commands included in the page has not been completed, the CPU 309 returns to step S4106, and repeats the same processing.

Subsequently, in step S4113, the CPU 309 stores the inspection information (Check_Info) shown in FIG. 32 in the storage apparatus 1502.

Next, in step S4114, the CPU 309 implements the rendering processing on the RAM 307 to generate a bitmap image.

Next, in step S4115, the CPU 309 outputs the bitmap image generated in step S4114 to the printer engine, thereby executing printing processing of the page. Subsequently, in step S4116, the CPU 309 determines whether or not the printing processing as to all of the pages has been completed in step S4115. Here, in the case of determining that the printing processing as to all of the pages has been completed, the CPU 309 proceeds to step S4117, and in the case of determining that the printing processing as to all of the pages has not been completed, the CPU 309 repeats the processing in steps S4104 through S4116 until the processing for all of the pages is completed.

Subsequently, in step S4117, the CPU 309 reads out the inspection information (Check_Info) stored in the storage apparatus 1502, further in step S4118 confirms a generation format of an instruction, in step S4119 generates output information for outputting an inspection instruction, in step S4120 outputs output information corresponding to the generated inspection instruction outside the image forming apparatus 100, and ends the present processing.

Note that there can be conceived a PDL for printing inspection information, a JDF whereby instructions as to an inspection apparatus can be described, and so forth as formats confirmed in step S4118.

Figure 33:
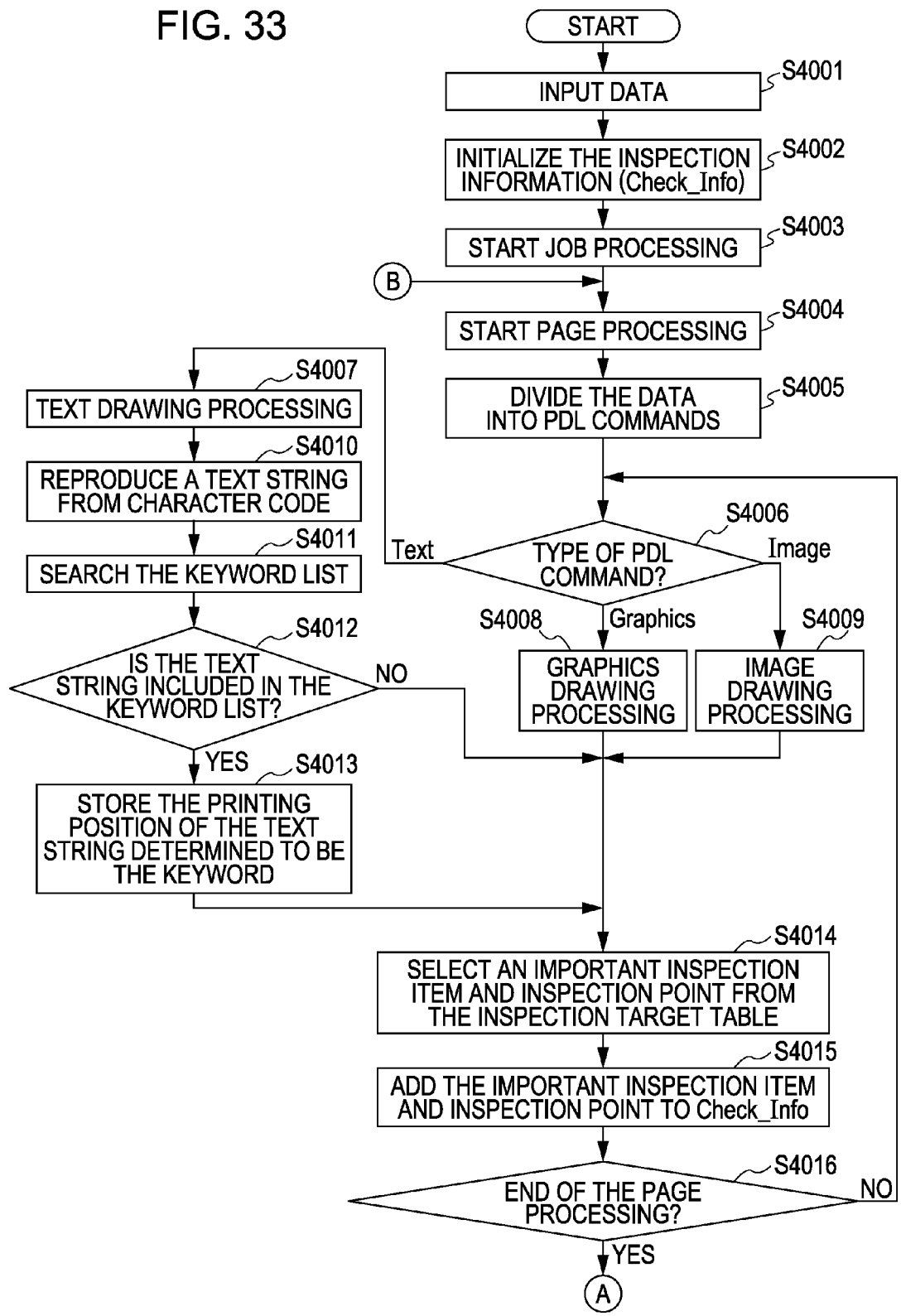
FIG. 33 is a flowchart illustrating an example of an eighteenth data processing procedure of an image forming apparatus according to an embodiment of the present invention.
Figure 34:
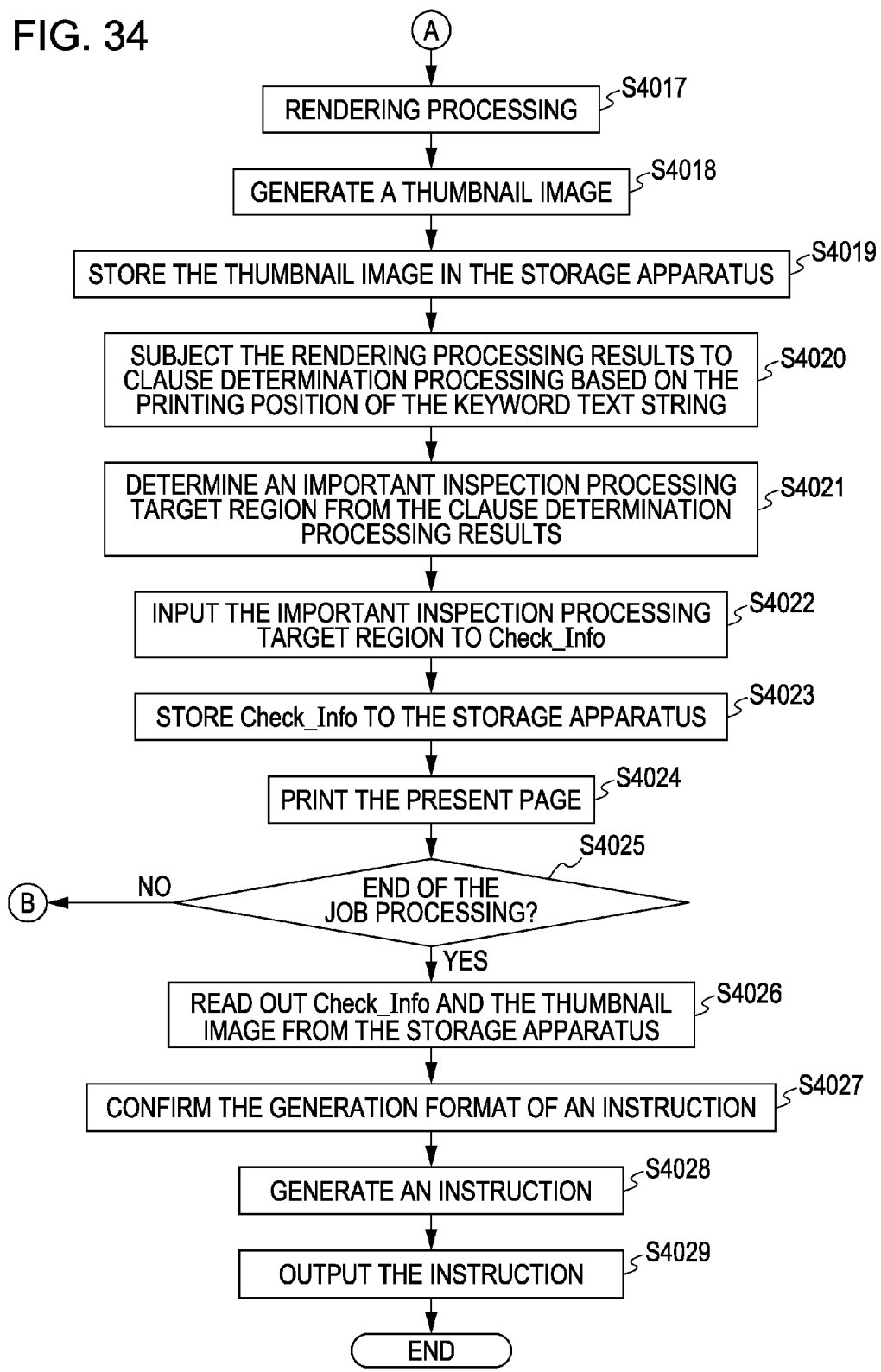
FIG. 34 is a flowchart illustrating an example of the eighteenth data processing procedure of an image forming apparatus according to an embodiment of the present invention.

A modification of the data processing according to the above-mentioned embodiment will be described next. FIGS. 33 and 34 are a flowchart illustrating an example of an eighteenth data processing procedure of an image forming apparatus according to an embodiment of the present invention. The present example is a modification of the processing shown in FIG. 4. Note that reference symbols S4001 through S4029 denote the respective steps, which are realized by the CPU 309 loading the control program stored in the ROM 305 to the RAM 307 to execute this. Note that, with the present processing, steps S4001 through S4009, S4014 through S4016, S4017, S4023 though S4025, and S4027 through S4029 are the same as steps S4101 through S4109, S4110 through S4112, S4114, S4113 through S4116, and S4118 through S4120, shown in FIG. 31, so description thereof will be omitted.

In step S4006, the CPU 309 determines the type of the PDL command currently being subjected to the analysis processing to select processing in accordance with the command. Here, in the case of determining that the command is a text processing command, the CPU 309 proceeds to step S4106.

Subsequently, in step S4007, the CPU 309 executes processing for drawing a text in accordance with the PDL command. Such processing includes readout of font data, change in a font size, alternate font selection processing in a case where a specified font does not exist, or the like.

Next, in step S4010, the CPU 309 generates a text string from character code. Next, in step S4011, the CPU 309 searches a keyword list set beforehand at the time of PDL analysis, and in step S4012 determines whether or not the text string includes a character matched with a keyword.

Here, in the case of determining that a matched keyword is not included, the CPU 309 proceeds to step S4014, and in the case of determining that a matched keyword is included, the CPU 309 proceeds to step S4013, stores the printed position of the text string determined to be a keyword as information determining an important region, and proceeds to step S4014.

Next, in step S4018, the CPU 309 instructs a region specified as an important region, or generates a thumbnail image to be enhanced. Subsequently, the CPU 309 stores the generated thumbnail image in the storage apparatus 1502.

Next, in step S4020, the CPU 309 subjects the image subjected to the rendering processing to paragraph determination processing based on the printed position of the keyword text string.

Next, in step S4021, the CPU 309 determines an important inspection processing target region based on the results of the paragraph determination processing in step S4020. Subsequently, in step S4022, the CPU 309 stores the determined important inspection processing target region to the inspection information (Check_Info). Also, in step S4026, the CPU 309 reads out the Check_Info and thumbnail image from the storage apparatus 1502, and performs processing in step S4027 and thereafter.

Thus, a region where an important region is described is automatically detected, and an output result wherein the important region is clearly specified on a thumbnail image is obtained.

Note that, with the above-mentioned respective embodiments, an arrangement may be made wherein results inspected in accordance with an inspection instruction are input to the image forming apparatus, and the results thereof are registered in a database as actual results data, and are managed.

Further, control may be performed wherein normal inspection processing is performed as to all of images including a form region, and a text string input to a variable region alone is collated with the content of data detected by OCR.

A structure of a data processing program which an image forming apparatus according to the present invention can read will be described with reference to a memory map shown in FIG. 35. FIG. 35 is a diagram describing a memory map of a recording medium storing various types of data processing programs which can be read by an image forming apparatus according to the present invention.

Note that, though not shown in the drawing, information for managing a program group stored in a recording medium, e.g., version information, programmer, and so forth is stored, and information depending on OS or the like on a program readout side, e.g., an icon for displaying a program in an identifiable manner, and so forth is stored in some cases.

Further, data belonging to various types of program is also managed in the above-mentioned directory. Also, a program for installing various types of program in a computer, or in a case where a program to be installed is compressed, a program for decompression, or the like, is stored in some cases.

The functions shown in FIGS. 4, 5, 7, 9, 11, 13, 16, 17, 20, 22, 23, 24, 26, 28, 29, 30, 31, 33, and 34 with the present embodiment may be executed by a program to be installed externally, through a host computer. Subsequently, in this case, even in a case where an information group including the program is supplied to an output apparatus from a recording medium such as CD-ROM, flash memory, FD, or the like, or an external recording medium through a network, the present invention can be applied.

As described above, a recording medium in which program code of software for realizing the functions of the above-mentioned embodiments is recorded is supplied to a system or device. Subsequently, it goes without saying that the functions of the above-mentioned embodiments of the present invention can be realized by the computer (or CPU or MPU) of the system or device thereof reading out and executing program code stored in a recording medium (i.e., computer-readable storage medium). In this case, the program code itself read out from the recording medium realizes a new function of the present invention, and consequently, the recording medium storing the program code thereof makes up the present invention.

Accordingly, the form of the program is irrelevant as long as the program has a function as a program, such as object code, program executed by an interpreter, script data supplied to the OS, or the like.

Examples of an available recording medium for supplying the program include a flexible disk, hard disk, optical disc, magneto-optical disk, MO, CD-ROM, CD-R, CD-RW, magnetic tape, nonvolatile memory card, ROM, and DVD. In this case, the program code itself read out from the recording medium realizes the functions of the above-mentioned embodiments, and consequently, the recording medium storing the program code thereof makes up the present invention.

Additionally, the following methods can be conceived as a program supplying method. The user employs a browser of a client computer to connect a homepage of the Internet. Subsequently, the computer program according to the present invention itself, or a compressed file including an automatic install function is downloaded to a recording medium such as a hard disk or the like, whereby the program can be supplied. Also, the program code making up the program according to the present invention is divided into multiple files, and each of the files is downloaded from a different homepage, whereby the program can be supplied as well. That is to say, a WWW server, ftp server, and so forth for downloading a program file for realizing the function processing of the present invention at a computer to multiple users are also included in the scope of the present invention.

Also, an arrangement may be made wherein the program of the present invention is encrypted, stored in a recording medium such as CD-ROM or the like, distributed to users, and a user who cleared predetermined conditions is allowed to download key information for decryption from a homepage through the Internet. Subsequently, the user employs the key information thereof to execute the encrypted program to be installed into a computer, whereby the functions of the above-mentioned embodiments can be realized.

Also, realization of the functions of the above-mentioned embodiments is not restricted to execution of the read program code by a computer. For example, there can be conceived a case wherein, based on the instructions of the program code thereof, the OS (Operating System) or the like running on the computer executes part or all of actual processing, and the processing thereof realizes the functions of the above-mentioned embodiments. It goes without saying that such a case is also encompassed in the present invention.

Further, there can be conceived a case wherein the program code read out from a recording medium is written in memory included in a function expansion board inserted into a computer or function expansion unit connected to a computer. Subsequently, based on the instructions of the program code thereof, a CPU or the like included in the function expansion board or function expansion unit executes part or all of actual processing, and the processing thereof realizes the functions of the above-mentioned embodiments. It goes without saying that such a case is also encompassed in the present invention.

The present invention is not restricted to the above-mentioned embodiments, various modifications (including various combinations of the embodiments) may be made based on the essence of the present invention, and these are not excluded from the scope of the present invention.

The present invention has been described with reference to various examples and embodiments, but it will be clear to one skilled in the art that the essence and scope of the present invention are not restricted to particular descriptions within the present Specification. While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-315679 filed Dec. 6, 2007, which is hereby incorporated by reference herein in its entirety.

What is claimed is:

1. An image forming apparatus, comprising:
an inspection unit that analyzes input printing information to determine whether the input printing information includes a processed command specified as an inspection target;
a selecting unit configured to select an inspection processing item based on the input printing information and on the inspection effect information indicating that there are inspection effects when the input printing information includes the processed command specified as the inspection target, wherein the selecting unit selects the inspection processing item corresponding to the processed command which satisfies a predetermined condition and excludes the inspection processing item corresponding to the processed command which does not satisfy the predetermined condition, and wherein the predetermined condition is decided by inputting feedback to include the inspection effects in the inspection processing item or to exclude the inspection effects in the inspection processing item;
a generating unit configured to generate inspection instruction information including the inspection processing item selected by the selecting unit; and
an output unit configured to output the inspection instruction information generated by the generating unit.

2. The image forming apparatus according to claim 1, wherein the output unit performs image-output of the inspection instruction information.

3. The image forming apparatus according to claim 1, wherein the output unit transmit-outputs the inspection instruction information to an external apparatus.

4. The image forming apparatus according to claim 1, wherein the selecting unit selects the inspection processing item to be inspected, for image-output in page units or in job units.

5. A method for data processing of an image forming apparatus comprising:
analyzing input printing information to determine whether the input printing information includes a processed command specified as an inspection target;
selecting an inspection processing item based on the input printing information and on inspection effect information indicating that there are inspection effects when the input printing information includes the processed command specified as the inspection target, wherein the inspection processing item corresponding to the processed command which satisfies a predetermined condition is selected and the inspection processing item corresponding the processed command which does not satisfy the predetermined condition is excluded, and wherein the predetermined condition is decided by inputting feedback to include the inspection effects in the inspection processing item or to exclude the inspection effects in the inspection processing item;

generating inspection instruction information including the selected inspection processing item; and outputting the generated inspection instruction information.

6. The method according to claim 5, wherein image-output of the inspection instruction information is output.

7. The method according to claim 5, wherein the inspection instruction information is transmitted to an external apparatus.

8. The method according to claim 5, wherein the inspection processing item to be inspected is selected, for image-output in page units or in job units.

9. A non-transitory recording medium storing a program for causing a computer to execute process steps of a method for data processing of an image forming apparatus, the process steps comprising:

analyzing input printing information to determine whether the input printing information includes a processed command specified as an inspection target;

selecting an inspection processing item based on the input printing information and on the inspection effect information indicating that there are inspection effects when the input printing information includes the processed command specified as the inspection target, wherein the inspection processing item corresponding to the processed command which satisfies a predetermined condition is selected and the inspection processing item corresponding to the processed command which does not satisfy the predetermined condition is excluded, and wherein the predetermined condition is decided by inputting feedback to include the inspection effects in the inspection processing item or to exclude the inspection effects in the inspection processing item;

generating inspection instruction information including the selected inspection processing item; and outputting the generated inspection instruction information.

* * * * *